(12) United States Patent
Langemyr et al.

(10) Patent No.: US 7,623,991 B1
(45) Date of Patent: *Nov. 24, 2009

(54) METHOD AND APPARATUS FOR THE SPECIFICATION AND AUTOMATIC DERIVATION OF PARTIAL DIFFERENTIAL EQUATIONS ASSOCIATED WITH COUPLED PHYSICAL QUANTITIES IN A MULTIPHYSICS PROBLEM

(75) Inventors: Lars Langemyr, Stockholm (SE);
Magnus Marklund, Stockholm (SE);
Arne Nordmark, Stockholm (SE);
Per-Olof Persson, Stockholm (SE);
Magnus Ringh, Burlington, MA (US)

(73) Assignee: Comsol AB (SE)

( * ) Notice: Subject to any disclaimer, the term of this patent is extended or adjusted under 35 U.S.C. 154(b) by 578 days.

This patent is subject to a terminal disclaimer.

(21) Appl. No.: 09/675,778

(22) Filed: Sep. 29, 2000

Related U.S. Application Data

(60) Provisional application No. 60/222,394, filed on Aug. 2, 2000.

(51) Int. Cl.
*G06F 7/60* (2006.01)
*G06F 17/10* (2006.01)

(52) U.S. Cl. ........................................... 703/2
(58) Field of Classification Search .................. 703/2
See application file for complete search history.

(56) References Cited

U.S. PATENT DOCUMENTS 5,408,638 A * 4/1995 Sagawa et al. ................ 716/20

(Continued)

OTHER PUBLICATIONS

Partial Differential Equation Toolbox User's Guide: For Use with MATLAB. © 1984-1997. p. 1-8.*

(Continued)

*Primary Examiner*—David R Vincent
*Assistant Examiner*—Dwin M Craig
(74) *Attorney, Agent, or Firm*—Nixon Peabody LLP

(57) ABSTRACT

Disclosed is a system for representing and modeling one or more systems in which each system corresponds to an application mode. For each application mode, physical quantities are modeled and may be defined using a graphical user interface. Physical properties may be used to model the physical quantities of each system. The physical properties may be defined in terms of numerical values or constants, and mathematical expressions that may include numerical values, space coordinates, time coordinates, and actual physical quantities. Physical quantities and any associated variables may apply to some or all of a geometric domain, and may also be disabled in other parts of a geometrical domain. Partial differential equations describe the physical quantities. One or more application modes may be combined using an automated technique into a combined system of partial differential equations as a multiphysics model. A portion of the physical quantities and variables associated with the combined system may be selectively solved for. The partial differential equations may be displayed and may in turn solve for the system of partial differential equations in accordance with a general form or a coefficient form. An automated technique provides for automatic derivation of the combined partial differential equations and boundary conditions. This technique automatically merges the equations from a plurality of application modes, and in some instances, performs symbolic differentiation of the equations, producing a single system of partial differential equations. A subset of physical quantities and associated variables not solved for may be used as initial values to the system of partial differential equations.

115 Claims, 24 Drawing Sheets

U.S. PATENT DOCUMENTS 6,349,272 B1 * 2/2002 Phillips .................... 703/2
6,810,370 B1 * 10/2004 Watts, III .................. 703/10

OTHER PUBLICATIONS

Wilks, Mike. "Primer on Object-Oriented Programming". 1996. http://www.eimc.brad.ac.uk/java/tutorial/Project1/ooprim.htm.*
FEMLAB User's Guide and Introduction. (c) 1994-1998, pp. 1-4 to 1-8.*
FEMLAB Reference Manual. (c) 1994-1998. pp. 4-36 to 4-39.*
FEMLAB 1.0 Reference Manual for use with MATLAB V5, Windows 95, Windows NT, Unix, 1994-1998.
FEMLAB 1.0 User's Guide and Introduction for use with MATLAB V5, Windows 95, Windows NT, Unix, 1994-1998.
FEMLAB 1.0 Model Library for use with MATLAB V5, Windows 95, Windows NT, Unix, 1994-1998.
FEMLAB 1.0 Structural Mechanics Engineering Module for use with FEMLAB, 1994-1998.
George et al., "Delaunay Triangulation and Meshing," *Hermes*, Paris 33-238 (1998); Delaunay triangulation: 33-46, 50-59; Constrained triangulation: 73-99; Parametric surface meshing: 161-173; Optimizations: 215-238.
Dahlquist et al., "Numerical Methods," *Prentice Hall* 284-355 (1974); Interpolation: 284-285; Linear Solver: 146-172; Time-Dependent Solver: 347-355;Eigenvalue Solver: 208-211; Damped Newton Method: 248-253.
Brenner et al., "The Mathematical Theory of Finite Element Methods," *Springer-Verlag*1-12 (1994); The Finite Element Method: 1-12.
Frey et al, "Mesh Generation, Application to Finite Elements," *Hermes*, Paris 88-90(2000); Mesh Search: 88-90.
Zienkiewicz et al., "The Finite Element Method," *McGraw-Hill* 1:23-177; Basis Function: 23-26; Quadrature Formulas, Gauss Points, Weights: 175-177.
Davenport et al., "Computer Algebra Systems and Algorithms for Algebraic Computation," *Academic Press* 28-32 (1993); Symbolic Differentiation: 28-32.
C. Johnson, "Numerical Solution of Partial Differential Equations by the Finite Element Method," *Studentlitteratur* 14-18 (1987); Test Function 14-18.
FEMLAB, "Installation Guide," For Use With MATLAB, Windows, UNIX, LINUX, Macintosh; Version 2.2 (Copyright 1994-2001 by COMSOL AB).
FEMLAB, "Reference Manual," For Use With MATLAB, Windows, UNIX, LINUX, Macintosh; Version 2.2 (Copyright 1994-2001 by COMSOL AB).
FEMLAB, "Chemical Engineering *Module*," For Use With MATLAB, Windows, UNIX, LINUX, Macintosh; Version 2.2 (Copyright 1994-2001 by COMSOL AB).
FEMLAB, "Model Library," For Use With MATLAB, Windows, UNIX, LINUX, Macintosh; Version 2.2 (Copyright 1994-2001 by COMSOL AB).
FEMLAB, "User's Guide and Instruction," For Use With MATLAB, Windows, UNIX, LINUX, Macintosh; Version 2.2 (Copyright 1994-2001 by COMSOL AB).
FEMLAB, "Electromagnetics Module," For Use With MATLAB, Windows, UNIX, LINUX, Macintosh; Version 2.2 (Copyright 1994-2001 by COMSOL AB).
FEMLAB®, "Installation and New Features Guide," Version 2.3 (Nov. 2002).
FEMLAB®, "Reference Manual," Version 1.0 (Jul. 1998).
FEMLAB, "FEMLAB 2.2: New Features © ," (2001) Printed from http://www.technion.ac.il/~leonidb/BursteinSite/Femlb22About.htm.
Anderson, D.G., "Iterative Procedures for Nonlinear Integral Equations," *Journal of the ACM* 12(4):547-560 (1965).
Notice of Allowance and Fee(s) Due, U.S. Appl. No. 09/995,222, filed Nov. 27, 2001, mail on Oct. 27, 2008, 10 pages.
Allowed Claims 43-86, U.S. Appl. No. 09/995,222, filed Nov. 27, 2001, 11 pages.
Saitz, J. "Newton-Raphson Method and Fixed-Point Technique in Finite Element Computation of Magnetic Field Problems in Media with Hysteresis", IEEE Transactions on Magnetics, vol. 35, No. 3, pp. 1398-1401, May 1999.
Canova, A. and M. Repetto. "Integral Solution of Nonlinear Magnetostatic Field Problems", IEEE Transactions on Magnetics, vol. 37, No. 3, pp. 1070-1077, May 2001.
Ribeiro, P. "Non-linear Forced Vibrations of Thin/Thick Beams and Plates by the Finite Element and Shooting Methods", Computers and Structures, vol. 82, pp. 1413-1423, May 2004.
Rao, P. "An Efficient Scalable Finite Element Model for Simulating Large Scale Hydrodynamic Flows", 16th ASCE Engineering Mechanics Conf., Jul. 16-18, 2003.
16th American Society of Civil Engineers (ASCE) Engineering Mechanics•Conference, Jul. 16-18, 2003. Printed Jan. 10, 2007. http://www.ce.washington.edu/em03/proceeedings/authorindex.htm.
Persson, P. "Implementation of Finite Element-Based Navier-Stokes Solver 2.094—Project", Apr. 25, 2002. http://www.mit.edu/~persson/nsfem_report.pdf.

* cited by examiner

FIG. 4

Equation: $p \cdot C \cdot T' - \nabla \cdot (k \nabla T) = Q + h(T_{ext} \cdot T) + C_{trans} \cdot (T^4_{ambtrans} \cdot T^4)$, T = temperature PDE Specification/ht Subdomain selection ☑ Unlock PDE coefficients

| Coefficient | Value | Description |
|---|---|---|
| p | 8930 | Density |
| C | 340 | Heat capacity |
| k | 384 | Coeff. of heat conduction |
| Q | 1./(0*(1+alpha*(T-T0)))*I | Heat source |
| h$_{trans}$ | 0 | Convect. heat transf. coeff. |
| T$_{ext}$ | 0 | External temperature |
| C$_{trans}$ | 0 | User defined constant |
| T$_{ambtrans}$ | 0 | Ambient temperature |

Name 1

☑ Active in the subdomain

☑ On top

OK    Cancel    Apply

FIG. 8

$$140 \begin{cases} d_{a\,lk}\dfrac{\partial u_k}{\partial t} - \dfrac{\partial}{\partial x_j}\left(c_{lkji}\dfrac{\partial u_k}{\partial x_i} + \alpha_{lkj}u_k - \gamma_{lj}\right) + \beta_{lki}\dfrac{\partial u_k}{\partial x_i} + a_{lk}u_k = f_l & \Omega \Big\}142 \\[2ex] n_j\left(c_{lkji}\dfrac{\partial u_k}{\partial x_i} + \alpha_{lkj}u_k - \gamma_{lj}\right) + q_{lk}u_k = g_l - h_{ml}\lambda_m \Big| \begin{matrix} \partial\Omega \Big\}146a \\ \partial\Omega \Big\}146b \end{matrix} \Big\}146 \\[2ex] h_{ml}u_l = r_m \end{cases}$$

FIG. 9

$$150 \begin{cases} d_{a\,lk}\dfrac{\partial u_k}{\partial t} + \dfrac{\partial \Gamma_{lj}}{\partial x_j} = F_l & \Omega \Big\}152 \\[2ex] -n_j\Gamma_{lj} = G_l + \dfrac{\partial R_m}{\partial u_l}\lambda_m & \begin{matrix} \partial\Omega \Big\}154a \\ \partial\Omega \Big\}154b \end{matrix} \Big\}154 \\[2ex] 0 = R_m \end{cases}$$

FIG. 10

$$324 \begin{cases} \gamma_{lj} = \Gamma_{lj} & f_l = F_l \\[6pt] c_{lkji} = -\dfrac{\partial \Gamma_{lj}}{\partial \left(\dfrac{\partial u_k}{\partial x_i}\right)} & \alpha_{lkj} = -\dfrac{\partial \Gamma_{lj}}{\partial u_k} \\[12pt] \beta_{lki} = -\dfrac{\partial F_l}{\partial \left(\dfrac{\partial u_k}{\partial x_i}\right)} & a_{lk} = -\dfrac{\partial F_l}{\partial u_k} \\[12pt] g_l = G_l & r_l = R_l \\[6pt] q_{lk} = -\dfrac{\partial G_l}{\partial u_k} & h_{lk} = -\dfrac{\partial R_l}{\partial u_k} \end{cases}$$

FIG. 11

$$240 \begin{cases} \Gamma_{lj} = c_{lkji} \dfrac{\partial u_k}{\partial x_i} \, \alpha_{lkj} u_k + \gamma_{lj} \\[8pt] F_l = f_l - \beta_{lki} \, a_{lk} u_k \\[8pt] G_l = g_l - q_{lk} u_k \\[8pt] R_m = r_m - h_{ml} u_l \end{cases}$$

FIG. 12

$$300 \begin{cases} \int_\Omega \left( \left( c_{lkji}\frac{\partial u_k}{\partial x_i} + \alpha_{lkj}u_k \right)\frac{\partial v}{\partial x_j} + \left( d_{a\,lk}\frac{\partial u_k}{\partial t} + \beta_{lki}\frac{\partial u_k}{\partial x_i} + a_{lk}u_k \right)v \right) dx + \\ \int_{\partial\Omega} q_{lk}u_k \, vds = \int_\Omega \left( Y_{lj}\frac{\partial v}{\partial x_j} + f_l v \right) dx + \int_{\partial\Omega} (g_l - h_{ml}\lambda_m) vds \\ \int_{\partial\Omega} \mu h_{mk}u_k \, ds = \int_{\partial\Omega} \mu r_m \, ds \end{cases}$$

FIG. 13

$$302 \begin{cases} \int_\Omega \left( \Gamma_{lj}\frac{\partial v}{\partial x_j} + F_l v - d_{a_{lk}}\frac{\partial u_k}{\partial t} v \right) dx + \int_{\partial\Omega} \left( G_l + \frac{\partial R_m}{\partial u_l}\lambda_m \right) vds = 0 \\ \int_{\partial\Omega} R_m \mu \, ds = 0 \end{cases}$$

FIG. 14

$$304 \begin{cases} U_k(x) = \sum_{l=1}^{N_p} U_{l,k} \phi_l(x), \quad \Lambda_m(x) = \sum_{K=1}^{N} \sum_{L=1}^{n} \Lambda_{K,L,m} \Psi_{K,L}(x) \end{cases}$$

FIG. 15

$$306 \begin{cases} \int_\tau \left( c_{lkji} U_{I,k}\frac{\partial \phi_I}{\partial x_i} + \alpha_{lkj} U_{l,k} \phi_I \right) \frac{\partial \phi_J}{\partial x_j} dx + \\ \int_\tau \left( d_{alk} \frac{\partial U_{I,k}}{\partial_I} \phi_i + \beta_{lkj} U_{i,k} \frac{\partial \phi_I}{\partial x_I} + \alpha_{lk} U_{i,k} \phi_i \right) \phi_J dx + \\ \int_{\partial\tau} q_{lk} U_{l,k} \phi_I \phi_J ds = \int_\tau \left( \gamma_{Ij} \frac{\partial \phi_J}{\partial x_j} + f_I \phi_J \right) dx + \\ \int_{\partial\tau} (g_I - h_{mI} \Lambda_{K,L,m} \Psi_{K,L}) \phi_J ds \end{cases}$$

FIG. 16

$$308 \begin{cases} \int_{\partial\tau} h_{mk} U_{J,k} \phi_I \Psi_{K,L} \, ds = \int_{\partial\tau} r_m \Psi_{K,L} \, ds \end{cases}$$

FIG. 17

$$312 \begin{cases} \int_\tau \left( \Gamma_{I,j} \frac{\partial \phi_J}{\partial x_j} + F_I \phi_J - d_{\alpha lk} \frac{\partial u_k}{\partial_I} \phi_J \right) dx + \int_{\partial t} \left( G_I + \frac{\partial R_m}{\partial u_l} \Lambda_{K,L,m} \Psi_{K,L} \right) \phi_J \, ds = 0 \\ \int_{\partial\tau} R_m \Psi_{K,L} \, ds = 0 \end{cases}$$

FIG. 18

$$310 \begin{cases} DA_{(J,l),(I,k)} = \int_\tau d_{alk} \phi_I \phi_J \, dx \\ C_{(J,l),(I,k)} = \int_\tau c_{lkji} \frac{\partial \phi_I}{\partial x_i} ? \frac{\partial \phi_J}{\partial x_j} \, dx \\ AL_{(J,l),(I,k)} = \int_\tau \alpha_{lkj} \phi_I ? \frac{\partial \phi_J}{\partial x_j} \, dx \\ BE_{(J,l),(I,k)} = \int_\tau \beta_{lki} \frac{\partial \phi_I}{\partial x_i} \phi_j \, dx \\ A_{(J,l),(I,k)} = \int_\tau a_{lk} \phi_I \phi_J \, dx \\ Q_{(J,l),(I,k)} = \int_\tau q_{lk} \phi_I \phi_J \, ds \\ GA_{(J,l)} = \int_\tau \gamma_{lj} \frac{\partial \phi_J}{\partial x_j} \, dx \\ F_{(J,l)} = \int_\tau f_I \phi_J \, dx \\ G_{(J,l)} = \int_{\partial \tau} g_I \phi_J \, ds \\ H_{(K,L,m),(I,k)} = \int_{\partial \tau} h_{mk} \phi_I \psi_{K,L} \, ds \\ R_{(K,L,m)} = \int_{\partial \tau} r_m \psi_{K,L} \, ds \end{cases}$$

FIG. 19

$$320 \begin{cases} DA \frac{\partial U}{\partial t} + C + AL + BE + A + Q) U + H^T \Lambda = GA + F + G \\ HU = R \end{cases}$$

FIG. 20

$$322 \begin{cases} DA\frac{\partial U}{\partial t} + H^T \Lambda = GA + F + G \\ R = 0 \end{cases}$$

FIG. 21

$$326 \begin{cases} J(U^{(k)}) \Delta U^{(k)} {}_{p} = (U^{(k)}) \\ U^{(k+1)} = U^{(k)} + \lambda_k \Delta U^{(k)} \end{cases}$$

FIG. 25

| 1-D Physics Application Modes | | |
|---|---|---|
| Application mode | Class name | Parent class |
| Diffusion | flpdedf1d | flpdedf |
| Heat Transfer | flpdeht1d | flpdeht |

⟩ 502

| 1-D PDE Application Modes | | |
|---|---|---|
| Application mode | Class name | Parent class |
| Coefficient PDE model, n variables | flpdec1d *(n)* | flpdec *(n)* |
| General PDE model, n variables | flpdeg1d *(n)* | flpdeg *(n)* |

2-D Physics Application Modes {506}

| Application Mode | Class name | Parent class |
|---|---|---|
| AC Power Electromagnetics | flpdeac | flpdec2d |
| Conductive Media DC | flpdedc2d | flpdedc |
| Diffusion | flpdedf2d | flpdedf |
| Electrostatics | flpdees2d | flpdees |
| Magnetostatics | flpdems2d | flpdems |
| Heat Transfer | flpdeht2d | flpdeht |
| Incompressible Navier-Stokes | flpdens2d | flpdens |
| Structural Mechanics, Plane Stress | flpdeps | flpdec2d |
| Structural Mechanics, Plane Strain | flpdepn | flpdec2d |

PDE Application Modes {508}

| Application Mode | Class name | Parent class |
|---|---|---|
| Coefficient PDE model, n variables | flpdec2d (n) | flpdec (n) |
| General PDE model, n variables | flpdeg2d (n) | flpdeg (n) |

FIG. 27
Application Object Properties

| Property name | Description | Data type |
|---|---|---|
| dim | Names of the dependent variables | Cell array of strings |
| form | PDE form | String (coefficient/ general) |
| name | Application name | String |
| parent | Parent class names | String. cell array of strings. or the empty matrix |
| sdim | Names of the independent variables (space dimensions) | Cell array of stings |
| submode | Name of current submode | String (std/wave) |
| tdiff | Time differentiation flag | String (on/off) |

512 {
```
function obj = myapp()
%MYAPP Constructor for a FEMLAB application object.

obj. name = 'My first FEMLAB application';
obj. parent = 'flpdeht2d';

% MYAPP is a subclass of FLPDEHT2D:

p1 = ''flpdeht2d;
obj = class (obj, 'myapp' , p1);
set (obj , 'dim' , default_dim (obj));
```

FIG. 29

Physics Modeling Methods

| Function | Purpose |
| --- | --- |
| appspec | Return application specifications. |
| bnd_compute | Convert application-dependent boundary conditins to generic boundary coefficents. |
| default_bnd | Default boundary conditions. |
| default_dim | Default names of dependent variables |
| default_equ | Default PDE coefficients/Material parameters. |
| default_init | Default initial conditions. |
| default_sdim | Default space dimension variables. |
| default_var | Default application scalar variables. |
| dim_compute | Return dependent variables for an application. |
| equ_compute | Convert application-dependent material parameters to generic PDE coefficients. |
| form_compute | Return PDE form. |
| init_compute | Convert application-dependent initial conditions to generic initial conditions |
| posttable | Define assigned variable names and post-processing information. |

530 $\quad \Delta E_z + (2\pi ik)^2 E_z = 0$

532 $\quad k = \dfrac{1}{\lambda} = \dfrac{f}{c}$

534 $\quad \overline{n} \cdot (\nabla E_z) + 2\pi ik_x E_z = 4\pi ik_x \sin\left(\dfrac{\pi}{d}(y - y_0)\right)$ 536 $\quad k^2 = k_x^2 + k_y^2$ 538 $\quad k_x = \sqrt{\dfrac{1}{\lambda^2} \dfrac{1}{(2d)^2}}$ 540 $\quad n \cdot (\nabla E_z) + 2\pi ik_x E_z = 0$ 542 $\quad E_z = 0$ 544 $\quad f_c \dfrac{c}{2d}$

FIG. 32

550 {
function obj = flwaveguid (varargin)
%FLWAVEGUIDE Constructor for a waveguide application object.

obj. name = 'In-Plane Waveguide';
obj. parent = 'flpdeac';

% FLWAVEGUIDE is a subclass of FLPDEAC:
p1 = flpdeac;
obj = class (obj), 'flwaveguide' ,p1);
set (obj), 'dim' , default_dim(obj));

FIG. 33

552 { fem.user fields

| Field | Description |
|---|---|
| geomparam | 1-by-2 structure of geometry parameters. |
| entrybnd | Index to the entry boundary |
| exitbnd | Index to the exit boundary |
| freqs | Frequency vector |

FIG. 34 fem.user fields

554

| Field | Description |
| --- | --- |
| startpt | Index of the lower left corner point of the waveguide. |
| type | Type of waveguide. ( *straight* or *elbow* ) |

FIG. 35 geomparam fields

556

| Field | Description | Defaults for elbow | Defaults for straight |
| --- | --- | --- | --- |
| entrylength | Length of the entrance part of the waveguide. | 0.1 | 0.1 |
| exitlength | Length of the exit part of the waveguide. | 0.1 | Not used |
| radius | Outer radius of the waveguide bend. | 0.05 | Not used |
| width | Width of the waveguide. | 0.025 | 0.025 |
| cavityflag | Turn resonance cavity *on* or *off* | 0 | 0 |
| cavitywidth | Width of the resonance cavity | 0.025 | 0.025 |
| postwidth | Width of the protruding posts. | 0.005 | 0.005 |
| postdepth | Depth of the protruding posts. | 0.005 | 0.005 |

METHOD AND APPARATUS FOR THE SPECIFICATION AND AUTOMATIC DERIVATION OF PARTIAL DIFFERENTIAL EQUATIONS ASSOCIATED WITH COUPLED PHYSICAL QUANTITIES IN A MULTIPHYSICS PROBLEM

CROSS REFERENCE TO RELATED APPLICATIONS

This application is based on U.S. Provisional Patent Application No. 60/222,394, filed on Aug. 2, 2000.

BACKGROUND

1. Technical Field

This application relates to computer systems, and more particularly to techniques for modeling, simulation, and problem solving using a computer system.

2. Description of Related Art

Computer systems may be used for performing any one of a variety of different tasks. One way in which computer systems may be utilized is by executing one or more computer programs that include instructions which, when executed, perform one or more tasks. In particular, a computer system may execute machine instructions, as may be generated, for example, in connection with translation of source code to machine executable code, to perform modeling, simulation, and problem solving tasks. One technique which may be used in connection with modeling a particular system is to represent various physical aspects of the system in terms of equations or other type of quantifications. In turn, these equations may be solved using a computer system for one or more variables.

Use of the computer in modeling may provide many advantages in accordance with the functionality included in a particular modeling or simulation package. At times, a user may wish to combine one or more systems that are each represented by a different models.

It may be desirous to provide an automatic technique for combining these one or more systems such that the combination of the systems together may be modeled and accordingly represented in terms of combined physical quantities and equations.

It may also be desirous and advantageous for this automatic technique to provide for selectively solving for one or more variables associated with either the combined system, or with variables included in one or more of the individual systems.

Additionally, it may be useful and advantageous to provide for different representations of equations that model the physical quantities of a particular system. The different types of representations of the equations may allow for different techniques to be utilized in connection with solving for the system of equations in a singular or combined system. It may be advantageous, for example, in that different forms of equations may proved to be more expedient and efficient for such types of equations such as linear or non-linear equations.

SUMMARY OF THE INVENTION

In accordance with one aspect of the invention is a method for producing a combined system of partial differential equations. Each of a plurality of systems is represented as an application mode modeling physical quantities of each system. A representation of a partial differential equation system is determined for each application mode corresponding to one of said plurality of systems. The combined system of partial differential equations is formed using partial differential equation systems associated with the plurality of systems.

In accordance with another aspect of the invention is a computer program product for producing a combined system of partial differential equations. Machine executable code represents each of a plurality of systems as an application mode modeling physical quantities of each system. Machine executable code determines a representation of a partial differential equation system for each application mode corresponding to one of said plurality of systems. Machine executable code forms the combined system of partial differential equations using partial differential equation systems associated with the plurality of systems.

In accordance with yet another aspect of the invention is a method for solving a system of partial differential equations. At least one user-defined application mode is defined for modeling physical quantities of an associated model. A representation of the partial differential equation system for the user-defined application mode of the associated model is determined.

In accordance with yet another aspect of the invention is a computer program product for solving a system of partial differential equations. Machine executable code is included for defining at least one user-defined application mode for modeling physical quantities of an associated model. Machine executable code is included for determining a representation of the partial differential equation system of the user-defined application mode of the associated model.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is an example of an embodiment of a graphical user interface for selecting the physical properties on subdomains for a heat transfer application mode;

FIG. 8 is an example of an embodiment of a coefficient form partial differential equation format;

FIG. 9 is an example of a general form partial differential equation format;

FIG. 10 is an example of formulae that may be used in an embodiment in solving for non-linear systems of equations in connection with performing substitutions for linearization;

FIG. 11 is an example of formulae that may be used when performing a conversion from coefficient to general form;

FIGS. 12 and 13 are example of formulae that may be used in solving for equations in coefficient and general form;

FIG. 14 is an example of formulae that may be used in approximating a finite-dimensional function space;

FIGS. 15 and 16 are examples of formulae that may be used in connection with solving systems of equations in coefficient form;

FIG. 17 is an example of an embodiment of formulae that may be used in connection with solving equations in the general form;

FIG. 18 is an example of the representation of finite element discretization in accordance with conditions of formulae of FIGS. 15 and 16;

FIG. 19 is an example of formulae that may be used in connection with solving equations in the coefficient form;

FIG. 20 is an example of formulae that may be used in connection with solving equations in the general form;

FIG. 21 is an example of an iteration formula that may be used in connection with solving equations in general form;

FIG. 25 is an example of one dimensional predefined application modes that may be included in an embodiment;

FIG. 26 is an example of two dimensional predefined application modes that may be included in an embodiment;

FIG. 27 is an example of properties of an application mode;

FIG. 28 is an example of a class constructor that may be used to create a user defined application or application mode;

FIG. 29 is an example of methods that may be included in an embodiment for an object class;

FIG. 31 is an example of formulae that may be used in connection with the user-defined application of FIG. 30;

FIG. 32 is an example of a constructor used in creating the user-defined application of FIG. 30;

FIG. 33 and FIG. 34 are examples of fields that may be included in a user-defined portion of a data structure used in connection with the user-defined application of FIG. 30; and FIG. 35 includes examples of fields that may be included in a data structure used to define a geometric object used in connection with the user-defined application mode of FIG. 30.

DESCRIPTION OF PREFERRED EMBODIMENT(S)

Figure 1:
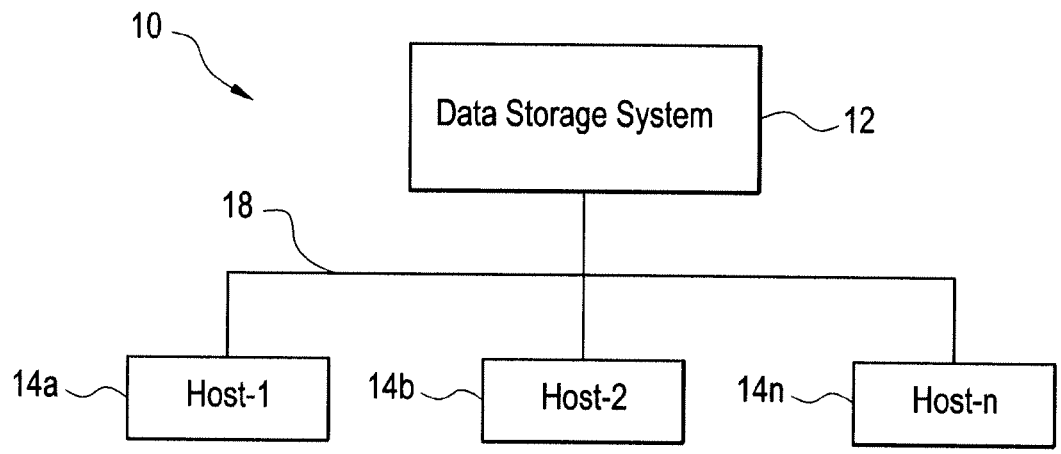
FIG. 1 is an example of an embodiment of a computer system.

Referring now to FIG. 1, shown is an example of an embodiment of a computer system according to the present invention. The computer system 10 includes a data storage system 12 connected to host systems 14a-14n through communication medium 18. In this embodiment of the computer system 10, the N hosts 14a-14n may access the data storage system 12, for example, in performing input/output (I/O) operations. The communication medium 18 may be any one of a variety of networks or other type of communication connections as known to those skilled in the art. For example, the communication medium 18 may be the Internet, an intranet, or other network connection by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a-14n, as well as those components that may be included in the data storage system 12 are described herein in more detail, and may vary with each particular embodiment. Each of the host computers 14a-14n, as well as the data storage system 12, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, or Fiber Channel. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations, such as storing and retrieving data files used in connection with an application executing on one or more of the host computer systems. For example, a computer program may be executing on the host computer 14a and store and retrieve data from the data storage system 12. The data storage system 12 may include any number of a variety of different data storage devices, such as disks, tapes, and the like in accordance with each implementation. As will be described in following paragraphs, software may reside and be executing on any one of the host computer systems 14a-14n. Data may be stored locally on the host system executing software, as well as remotely in the data storage system 12 or on another host computer system. Similarly, depending on the configuration of each computer system 10, software as described herein may be stored and executed on one of the host computer systems and accessed remotely by a user on another computer system using local data. A variety of different system configurations and variations are possible then as will be described in connection with the embodiment of the computer system 10 of FIG. 1 and should not be construed as a limitation of the techniques described elsewhere herein.

Figure 2:
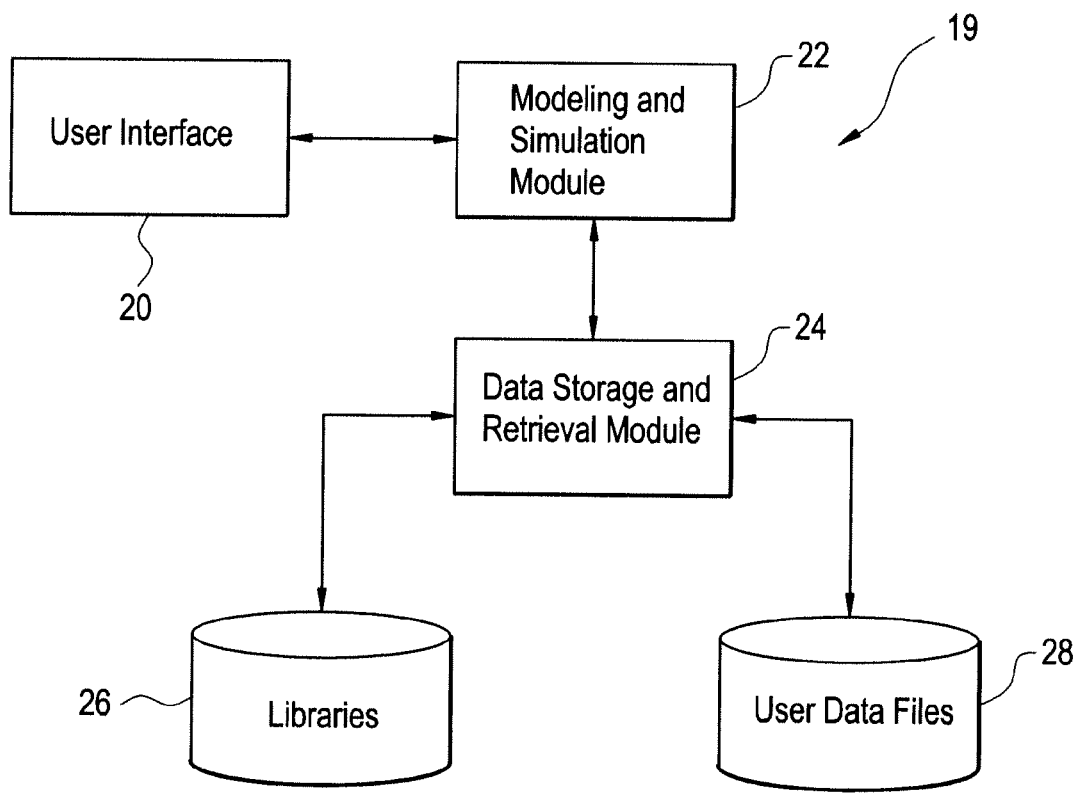
FIG. 2 is an example of an embodiment of software that may reside and be executed in one of the hosts of FIG. 1.

Referring now to FIG. 2, shown is an example of an embodiment of the software 19 that may reside in one of the host computer systems such as whose computer system 14a-14n. Included in the software of computer system 14a of FIG. 2 is a User Interface module 20 that communicates with the Modeling and Simulation module 22. The software further includes a Data Storage and Retrieval module 24 which communicates with the Modeling and Simulation module 22 for performing tasks in connection with data storage and retrieval. The Data Storage and Retrieval module 24 may retrieve data files, for example, that may be stored in Libraries 26 as well as perform data operations in connection with User Data Files 28.

It should be noted that other embodiments may include other software components other than what is described and functionally represented in the software modules 19 of FIG. 2. In the embodiment shown in FIG. 2, both the Libraries and the User Data Files are shown as being stored locally within the host computer system. It should also be noted that the Libraries and/or User Data Files, as well as copies of these, may be stored in another host computer system as well as in the Data Storage System 12 of the computer system 10. However, for simplicity and explanation in paragraphs that follow, it is assumed that the software may reside on a single host computer system such as 14a with additional backups, for example, of the User Data Files and Libraries, in the Data Storage System 12.

In one embodiment, portions of the software 19, such as the user interface 20, the Modeling and Simulation module 22, Data Storage and Retrieval module, and Libraries 26 may be included in combination in a commercially available software package. These components may operate on one of the host systems 14a-14n running Matlab V5.0, as well as one of Windows 95 or 98, Windows NT, Unix, or Linux operating system. One embodiment of the software 19 may be implemented using MATLAB5.3 running on one of Windows 95, Windows NT, Unix or Linux operating systems.

The User Interface module 20 as will be described in more paragraphs that follow, may display user interface screens in connection with obtaining data used in performing modeling, simulation, and/or other problem solving for one or more systems under consideration. These one or more systems may be modeled and/or simulated by the Modeling and Simulation module 22. Data gathered such as in connection with the User Interface 20 and used by the Modeling and Simulation module 22 may be forwarded to the Data Storage and Retrieval module 24 where user-entered data, for example, may be stored in User Data Files 28. Additionally, other data and information may be obtained from the Libraries 26 as needed by the Modeling and Simulation module or in connection with the User Interface 20. In this particular example, the software in the modules may be written in any one of a variety of computer programming languages such as C, C++, Java or any combination of these or other commercially available programming languages. For example, one embodiment includes software written in MATLAB 5.3 and C. C routines may be invoked using the external function interface of MATLAB.

Additionally, various data files such as User Data Files 28 and the Libraries 26 may be stored in any one of a variety of data file formats in connection with a file system that may be used in the host computer system, for example, or in the Data Storage System 12. An embodiment may use any one of a variety of database packages in connection with the storage and retrieval of data. The User Data files 28 may also be used in connection with other software simulation and modeling packages. For example, the User Data files 28 may be stored in a format that may also be used directly or indirectly as an input to any one of a variety of other modeling packages, such as Matlab. In particular, an embodiment may provide for importing and exporting data between this system and another system, such as Matlab, for example. The precise format of the data may vary in accordance with each particular embodiment as well as the additional functionalities included therein.

As will be described in more detail in connection with following figures, paragraphs that follow describe a technique that may be used in combining application modes modeling different systems. Properties of these application modes represented by partial differential equations (PDEs) may be automatically combined to form PDEs describing these quantities in a combined system or representation. The combined PDEs when displayed, for example, in a "coefficient view" may be modified and further used as input to a finite element solver. It should be noted that the differential equations may be provided to the finite element solver either independently, describing a single system, or as a combined system of PDEs.

The software 19 provides the ability to combine application modes that model physical properties through one or more graphical user interfaces (GUIs) in which the user selects one or more application modes from a list. When a plurality of application modes are combined, this may be referred to as a multiphysics model. In addition to the application mode names, the variable names for the physical quantities may be selected through a GUI. Application modes may have different meanings depending on a "submode" setting. This is described in more detail elsewhere herein.

The physical properties that are used to model the physical quantities in a system under examination in connection with the software 19 may be defined using a GUI in which the physical properties may be described as numerical values. These physical properties may also be defined as mathematical expressions including one or more numerical values, space coordinates, time coordinates and the actual physical quantities. The physical properties may apply to some parts of a geometrical domain, and the physical quantity itself can also be disabled in the other parts of the geometrical domain. A geometrical domain or "domain" may be partitioned into disjoint subdomains. The mathematical union of these subdomains forms the geometrical domain or "domain". The complete boundary of a domain may also be divided into sections referred to as "boundaries". Adjacent subdomains may have common boundaries referred to as "borders". The complete boundary is the mathematical union of all the boundaries including, for example, subdomain borders. For example, in one embodiment, the geometrical domain may be one-dimensional, two-dimensional or three dimensional in the GUI. However, as described in more detail elsewhere herein, the PDE solution solvers may be able to handle any space dimension. Through the use of GUIs in one implementation, the physical properties on the boundary of the domain may be specified and used to derive the boundary conditions of the PDEs.

Additional function included in the software 19, such as in the Modeling and Simulation module, may provide for automatically deriving the combined PDEs and boundary conditions of the multiphysics system. This technique merges the PDEs of the plurality of systems, and may perform symbolic differentiation of the PDEs, and produce a single system of combined PDEs.

The combined PDEs may be modified before producing a solution. In this embodiment, this may be performed using a dialog box included in a GUI displaying the combined PDEs in a "coefficient view". When the derived PDEs are modified in this way, the edit fields for the corresponding physical properties become "locked". The properties may subsequently be unlocked in this embodiment by an explicit user action.

It should be noted that an embodiment may include functionality for modeling any one or more of many engineering and scientific disciplines. These may include, for example, acoustics, chemical reactions, diffusion, electromagnetics, fluid dynamics, general physics, geophysics, heat transfer, porous media flow, quantum mechanics, semiconductor devices, structural mechanics, wave propagation, and the like. Some models may involve more than one of the foregoing systems and rather may require representing or modeling a combination of the foregoing. The techniques that are described herein may be used in connection with one or more systems of PDEs. In one embodiment described herein, these PDEs may be represented in general and/or coefficient form. The coefficient form may be more suitable in connection with linear or almost linear problems, while the general form may be better suited for use in connection with non-linear problems. The system(s) being modeled may have an associated submode, for example, such as stationary or time dependent, linear or non-linear, scalar or multi-component. An embodiment may also include the option of performing, for example, eigenvalue or eigenfrequency analysis. In the embodiment described herein, a Finite Element Method (FEM) may be used to solve for the PDEs together with, for example, adaptive meshing and a choice of a one or more different numerical solvers.

In one embodiment, a finite element mesh may include simplices forming a representation of the geometrical domain. Each simplex belongs to a unique subdomain, and the union of the simplices forms an approximation of the geometrical domain. The boundary of the domain may also be represented by simplices of the dimensions 0, 1, and 2, for geometrical dimensions 1, 2, and 3, respectively. The finite element mesh may be formed by using a Delanunay technique, for example, as described in "Delanunay Triangulation and Meshing", by P.-L. George, and H. Bourouchaki, Hermes, Paris, 1998. Generally, this technique may be used to divide the geometrical domain into small partitions. For example, for a 1-dimensional domain, the partitions may be intervals along the x-axis. For a 2-dimensional square domain, the domain may be partitioned into triangles or quadrilaterals. For a 3-dimensional domain, the domain may be partitioned into tetrahedrons, blocks or other shapes.

It should be noted that a mesh representing a geometry may also be created by an outside or external application and may subsequently be imported for use into this system in this embodiment.

The initial value of the solution process may be given as numerical values, or expressions that may include numerical values, space coordinates, time coordinates and the actual physical quantities. The initial value(s) may also include physical quantities previously determined.

The solution of the PDEs may be determined for any subset of the physical properties and their related quantities. Further, any subset not solved for may be treated as initial values to the system of PDEs.

Figure 3:
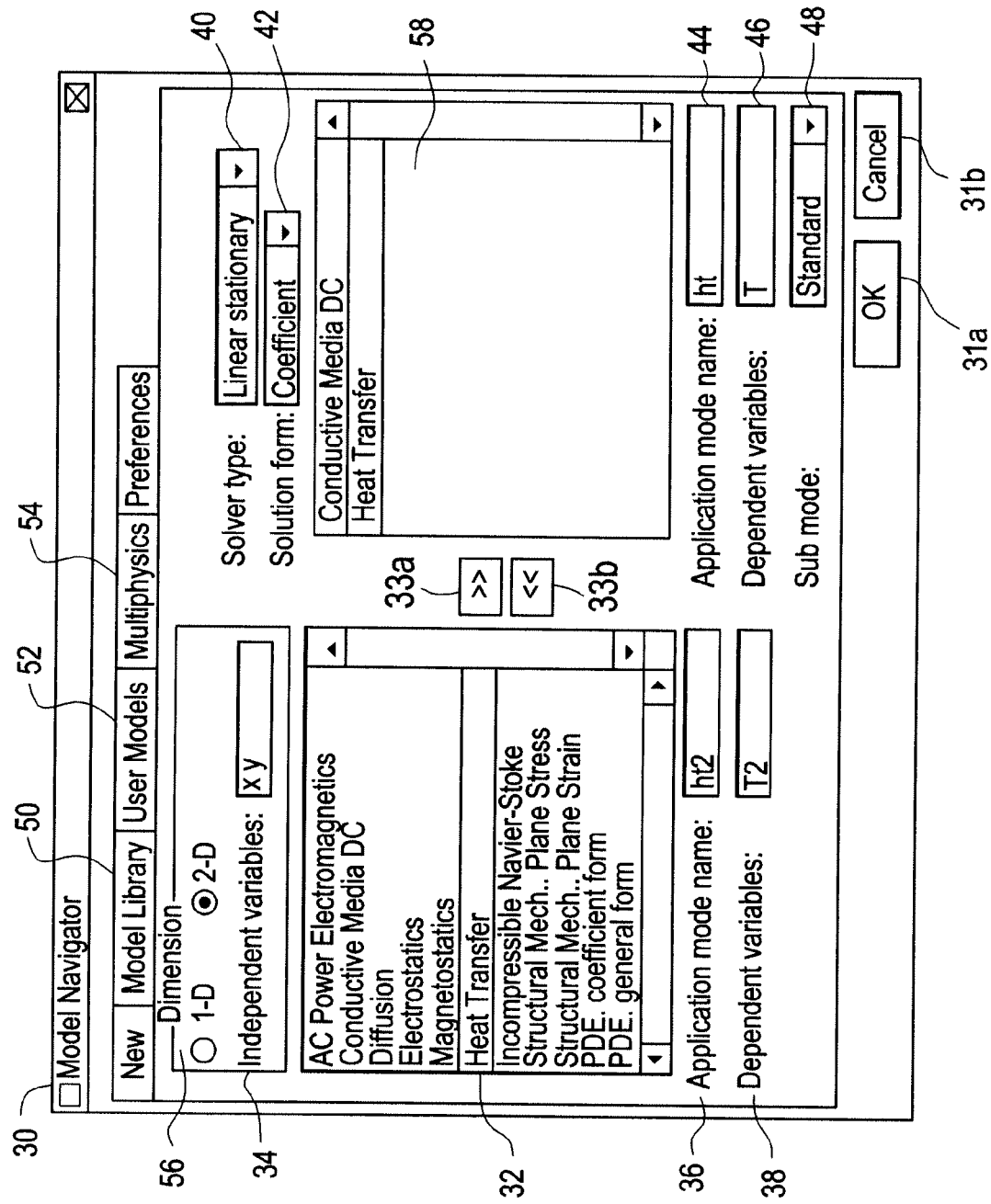
FIG. 3 is an example of an embodiment of a graphical user interface for selecting the application modes.

Referring now to FIG. 3, shown is an example of an embodiment of a user interface or GUI 30 that may be used in connection with specifying a multiphysics system of more than one system to be combined. In this example, each system to be combined may correspond to an application mode. Through the use of the GUI 30, the application modes that are to be used in this combined multiphysics system may be specified. Each application mode models physical quantities in terms of PDEs. The physical quantities may be represented either directly as the dependent variables in the PDE, or by a relation between the dependent variable and the variable representing the physical quantity. The PDEs in this embodiment may be generally "hidden" from the user through the use of the GUIs. When several application modes are combined into one single model or system, it may be referred to as a multiphysics model.

The list of application modes 32 is the list of possible application modes from which a user may select in accordance with the user choice of space dimension indicated the buttons 56 in the left-hand top of the GUI 30. To add application modes to a multiphysics model, the user selects application modes from the left-most list box 32 and may specify that these application modes are to be included in a multiphysics model, for example, selecting the button 33a. After selection, this application mode is added to the list 58 on the right hand side of the GUI 30. Application modes may also be removed from the list by selecting button 33b. Before adding an application mode, the user may edit its name 36 and names of the variables 38 representing the physical quantities that may be solved for, for example, resulting in the new name 44 and new name of the variable 46.

Each application mode in the multiphysics model is given a unique name that may be used to identify the origin of the variables in the multiphysics model. The example shown in the GUI 30 is for an application mode "Heat Transfer" in the list 32. When selected using button 33a, the application mode appears on list 58. The user may edit the application mode name, for example, changing it from that included in display 36 to the corresponding name of display item 44. Similarly, the dependent variable name may be modified from that shown in item 38 to the item 46. In this example, only one variable is associated with the Heat Transfer application mode. For an application mode including more than one physical quantity, the user may enter all the names of the physical quantities as space-separated entries in the Dependent variables edit field 46.

There are also application modes that directly correspond to PDEs. In these modes, the quantities are represented by the dependent variables. Each of these application modes may have more than one dependent variable. The number of dependent variables and the dimension of system of PDEs may be determined by entering one or more corresponding space-separated variable names.

On the right-hand side of the multiphysics GUI 30, a solver type and solution form may be selected. The solver type may be specified in the item 40, for example, as one of stationary, time-dependent, and the like. Similarly, the solution form may be specified in item 42, for example as "coefficient" or "general" form. These refer to the form of the PDE for which the solution is derived and are described in more detail elsewhere herein. The solver types and solution forms may vary in accordance with the application modes of the multiphysics model. In the list box 58, all the application modes that have been added to the model appear. A user may select any of the model's application modes and change its submode 48. Generally, a submode may relate to the manner in which equations are derived or differentiated, for example, with respect to what variables differentiation may be performed.

In this example, shown is the standard submode as being specified in item 48. Additionally, an application mode may include other associated submodes, for example, such as, a wave-extension submode that extends a standard time-dependent equation to a wave equation using the second derivative of the standard equation with respect to time. Selecting OK using button 31a saves the updated multiphysics model with all the added application modes and closes the GUI 30. In contrast, selecting Cancel using button 31b closes the GUI and discards any changes. Referring to FIG. 2, when the OK button 31a is selected, the data may be communicated from the GUI 20 to the Modeling and Simulation Module 22 and subsequently to the Data Storage and Retrieval Module 24 for storage in the User Data Files 28.

The foregoing screen display, such as GUI 30, may be displayed by and included as a portion of the software of the User Interface Module 20 of the software 19. It should be noted that an embodiment may include different types of application modes. In one embodiment, application modes may be classified as one of user defined or predefined. A predefined application mode may be one for which functionality is included in the libraries 26 as may be available from a software vendor. In other words, a software vendor may supply libraries including defined systems of PDEs, GUIs and the like for a particular type of system, such as heat transfer. Additionally, an embodiment may include support to provide for user-defined models or application modes for which a user may specify the PDEs, the quantities being modeled, and the like. Subsequently, a user-defined model may be saved in a user defined library, for example, included in the user defined data files 28. Definitions and other data files associated with a user-defined model may be stored in any one of a variety of data formats, for example, similar to those of the libraries 26 that may be included in an implementation by a software vendor. The format and function may vary in accordance with each embodiment.

In one embodiment, a user may define and add a user-defined application mode by adding functions in MATLAB format for transforming the physical properties on subdomains, boundaries, and initial conditions. The user may specify a first function, equ_compute, for transforming physical quantities to PDE coefficients, a second function, bnd_compute, for transforming the physical properties on the boundaries to boundary conditions, and a third function, init_compute, for transforming the physical properties in the initial condition. More detail on user defined application modes is described elsewhere herein.

Referring now to FIG. 4, shown is an example of an screen display of the physical property specification GUI 60 for the heat transfer application mode. In this embodiment, each application mode may have a specifically designed GUI display in which the physical properties associated with that application mode may be specified. The list 62 in the left of the GUI 60 includes one or more geometrical domains to which the physical properties may apply. These may also be referred to as subdomains. The user may select one or several subdomains from the list 62, for example, using a mouse, keyboard or other selection device. If a single subdomain is selected, entering a new name in the edit field Name 62a may change the name. If the user selects multiple subdomains, the properties that are specified apply to all the selected subdomains. The "on-top" check box 64a makes the boundary condition GUI "float" on top of the view of the geometrical domain also. In other words, the corresponding dialogue box "floats" on top of other items that may be displayed on the screen in connection with the GUI.

In this embodiment, if the properties of the currently selected subdomains differ, the edit fields for the properties may be "locked" for no editing. One may unlock the subdomains by explicitly checking the Unlock check box 64a. The properties from the first selected subdomain may be copied to all the selected subdomains.

It should be noted that in one embodiment, selecting several subdomains with different physical properties may also cause locking. Checking "unlocking" may then result in the properties in the first selected subdomain being copied to the other subdomains.

The physical properties of the subdomains are specified in the list 64. As previously described, these properties may be specified as numerical values, or also as symbolic expressions in terms of the space coordinates, the physical quantities and their space derivatives, and the time. Additionally, a name of a procedure to compute a value of the property may also be specified by entering the name and any parameters that may be included in the procedure. In one embodiment, the procedure may be written, for example, in C, Fortran, or Matlab. The particular language of implementation may vary in accordance with each particular embodiment and the calling standards and conventions included therein.

A user may also disable the physical quantities of an application mode in a subdomain entirely by un-checking the "Active in this Subdomain" checkbox 66. This removes the properties in 64 from the application in the selected subdomain(s). Also the physical quantities in this application mode are disabled in the selected subdomain(s).

Figure 5:
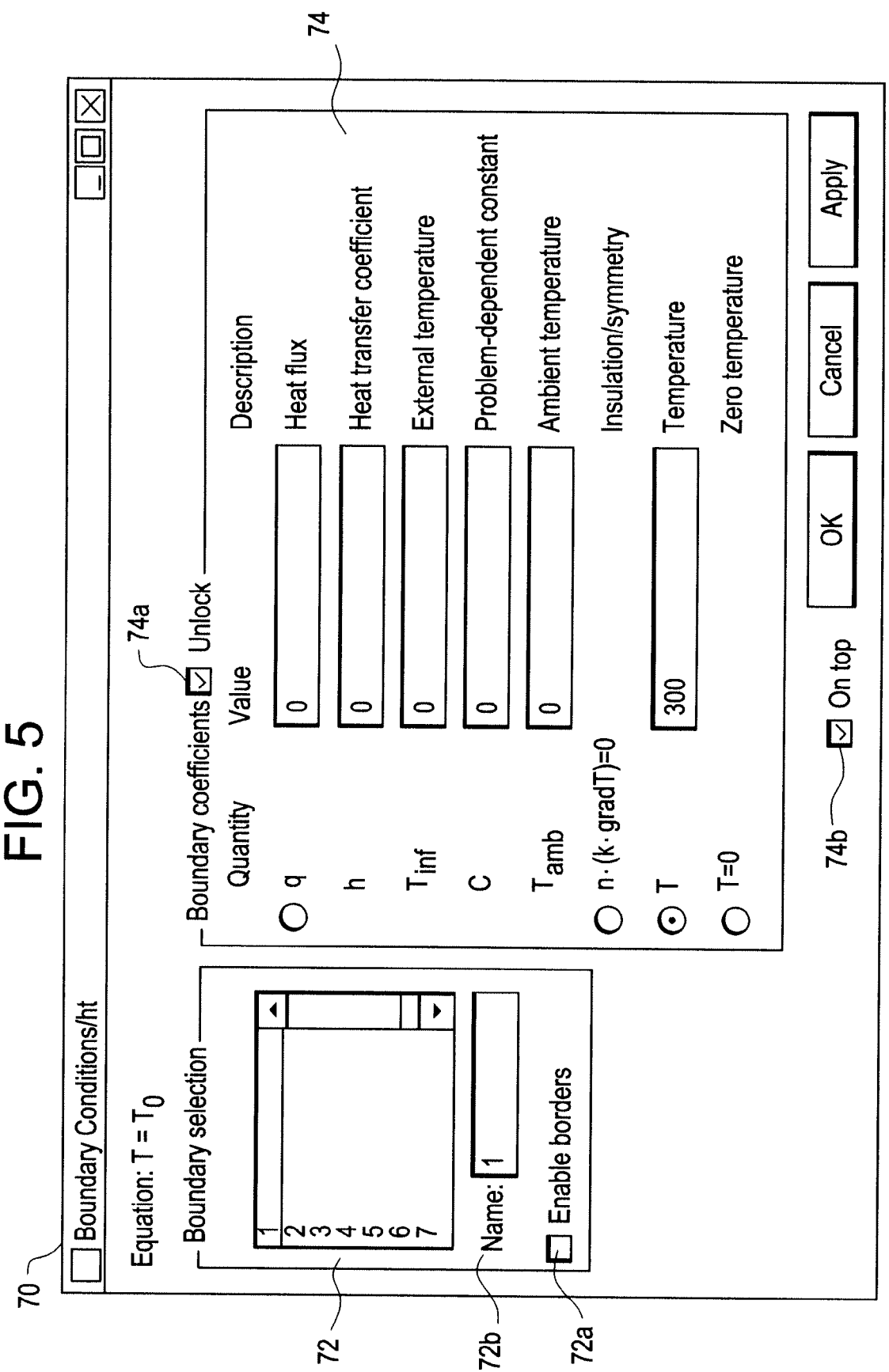
FIG. 5 is an example of an embodiment of a graphical user interface for specifying physical properties on boundaries for a heat transfer application mode.

Referring now to FIG. 5, shown is an example of a screen display of a GUI 70 which is a physical property boundary specification GUI for the heat transfer application mode. The list 72 in the left portion of the GUI 70 includes geometrical boundaries where the physical properties may apply. Only the boundaries that form the outer boundary with respect to the active subdomains are included in the list. As described elsewhere herein, those subdomains that are "active" may be specified in the GUI 60 for physical properties.

Boundaries that are entirely inside the subdomain or between two subdomains are also not shown unless the "Enable borders" check box 72a is selected. A user may select one or several boundaries from the list 72. If the user selects a single boundary, the user can change its name by entering a new name in the Name edit field 72b. If the user selects multiple boundaries, the properties that the user specifies, as in list 74, apply to all the selected boundaries. If the properties on the currently selected boundaries differ, the edit field 72b for the properties is locked. One may unlock the subdomains by explicitly checking the "Unlock" check box 74a. The properties from the first selected boundary are then copied to all the selected boundaries.

In one embodiment, selecting several boundaries with different physical properties may also cause locking. Checking "unlock" may then result in the properties in the first selected boundary being copied to the other boundaries.

The physical properties of the geometrical boundaries are specified in the list 74 in the right hand portion of the GUI 70. These properties have values that may be specified as numerical values, or symbolic expressions in terms of the space coordinates, the physical quantities and their space derivatives from any application modes added by using the previous section, and the time. Additionally, the name of a procedure to determine the value of the property may also be specified in a manner similar to as described elsewhere herein.

It should be noted that a portion of the different GUIs displayed may be similar, for example, such as the "on top" check box 74b that is similar in function to 64a as described elsewhere herein.

Figure 6:
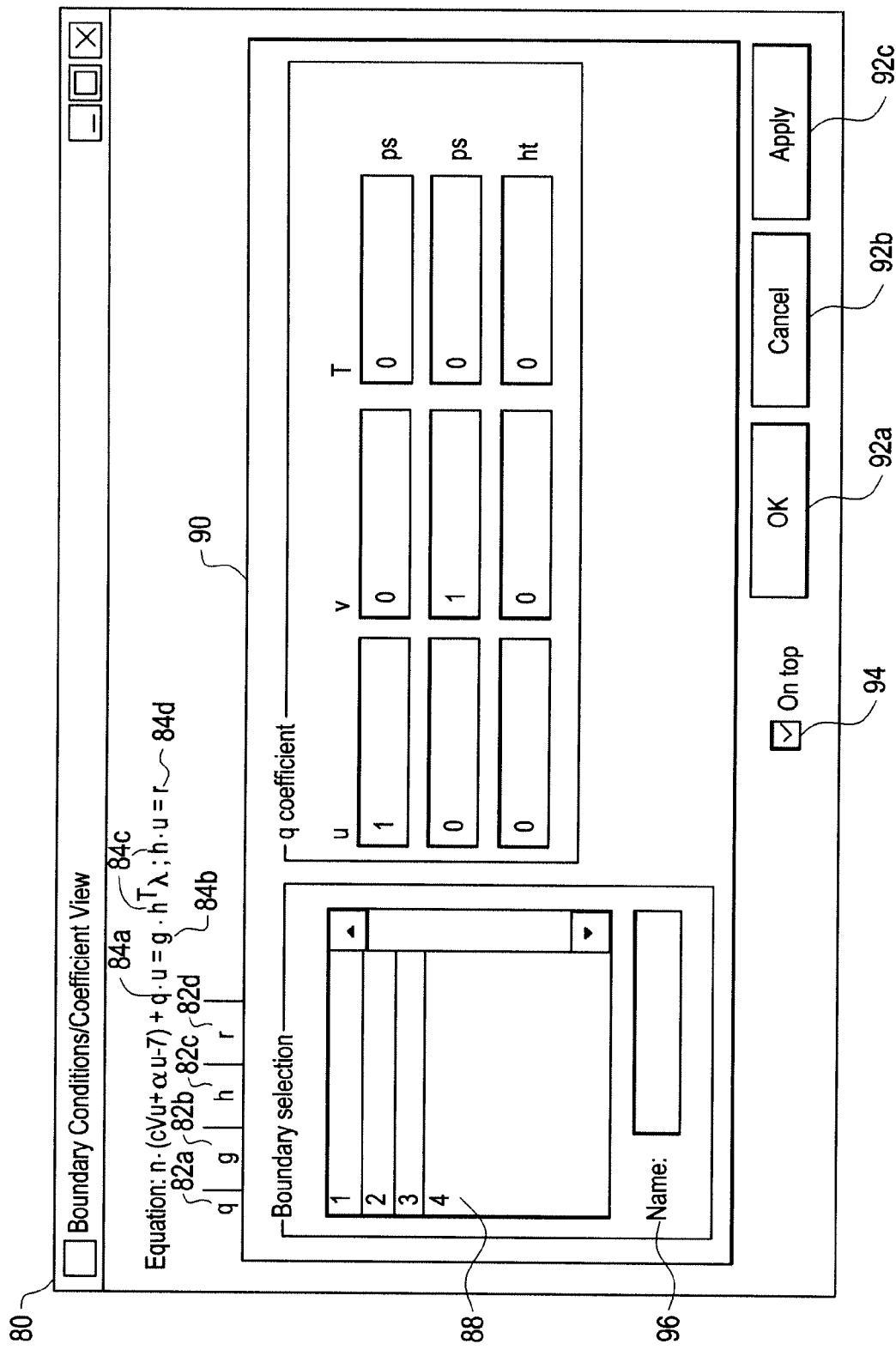
FIG. 6 is an example of an embodiment of a graphical user interface for modifying the partial differential equations in "coefficient view"

Referring now to FIG. 6, shown is an example of an embodiment of a screen display that may be used in connection with modifying the PDEs in a "coefficient view". Using this interface 80 of FIG. 6, this may be used in connection with modifying the boundary conditions in coefficient view as associated with the combined system of PDEs. It should be noted that other embodiments may also include a similar screen display and interface to allow for modification of PDEs of each individual application mode or system being modeled. Additionally, an embodiment may also include a similar screen display for modifying a system in general form rather than coefficient form as shown in the display 80 of FIG. 6.

The GUI 80 may be displayed in connection with modifying the boundary conditions associated with a coefficient. For example, in the GUI 80, the boundaries 1 and 3 have been selected as associated with the coefficient tab "q" 82a corresponding to the coefficient appearing in the PDE at position 84a. The list 90 on the right hand side of the GUI 80 includes the boundary conditions associated with the active "q" coefficient. A user may modify the conditions associated with the currently active coefficient, such as "q". Any one of the tabbed coefficients, such as 82a-82d may be made active, for example, by selecting the tab, such as with a mouse or other selection device. This causes the right hand portion 90 of the GUI 80 to be updated with corresponding values for the currently active coefficient. The values may be modified by editing the fields of 90 and selecting the OK button 92a, or the apply button 92c. The modification may be cancelled, as by selecting the cancel operation button 92b. A boundary number that is selected on list 88 may be changed to have a symbolic name, as may be specified in field 96. The values indicated in 90 are set accordingly for the selected boundaries 88. The on-top check box 94, and other features of GUI 80, are similar to those appearing in other GUIs and described in more detail elsewhere herein.

It should be noted that the PDE coefficient and boundary conditions associated with the combined system of PDEs for the various application modes selected may be stored in a data structure that is described in more detail elsewhere herein. Subsequently, if these coefficient and boundary conditions are modified, for example, using the GUI 80 of FIG. 6, the corresponding data structure field(s) may be updated accordingly. As will be described in connection with other figures, the combined system of PDEs and associated boundary condition fields may be updated.

It should also be noted that the dialog for modifying the boundary conditions in coefficient view of a system of three variables may be viewed in the example GUI 80 of FIG. 6. If the system to be solved is in general form, the coefficient view dialog box may also include symbolic derivatives of the general form coefficients with respect to the physical quantities or solution components and their derivatives according to FIG. 10. As described in more detail elsewhere herein, the derivatives may be used for the solution of nonlinear stationary and time-dependent problems.

In one embodiment, when the coefficients in coefficient view are changed for a subdomain or a boundary, the "Unlock check-box" in the corresponding application modes for that subdomain or boundary dialog box is enabled, as previously described in connection with GUI 70 of FIG. 5. In one embodiment, in order to disable the change in coefficient view, a user may remove the checkmark as may be displayed in the Unlock check box on the subdomain or boundary in the application mode, for example, as described in connection, respectively, with GUIs 60 and 70.

Figure 6A:
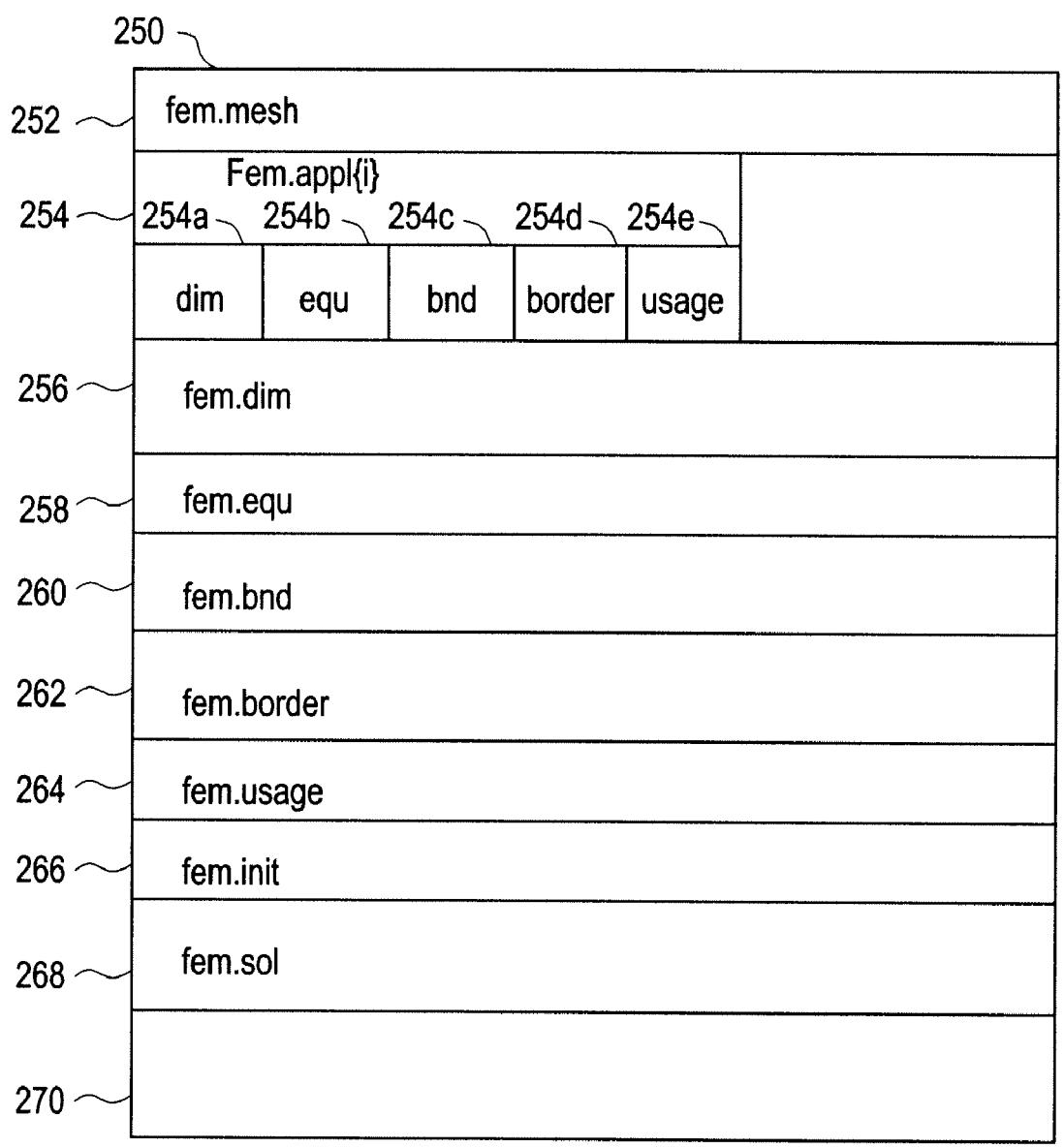
FIG. 6A is an example of an embodiment of a data structure that may be used in connection with data for each application mode selected and also in connection with storing data for the combined partial differential equation system of application modes.

Using the GUIs 60 and 70 for, respectively, physical properties for subdomains and boundaries, as well as possible modifications specified as with GUI 80, the Modeling and Simulation Module 22 may create, initialize, and possibly modify the data structure 250 of FIG. 6A.

Referring now to FIG. 6A, shown is an example of a representation of the data structure that may be included in an embodiment in connection with storing data in connection with the PDEs selected and combined. The data in the data structure 250 may include data used in connection with the multiphysics model.

The data structure 250 includes the following fields:

| Data field | Description |
|---|---|
| fem.mesh | Finite element mesh |
| fem.appl{i} | Application mode I |
| fem.appl{i}.dim | Dependent variable name |
| fem.appl{i}.equ | Domain physical data |
| fem.appl{i}.bnd | Boundary physical data |
| fem.appl{i}.submode | Text string containing submode setting |
| fem.appl{i}.border | Border on or off |
| fem.appl{i}.usage | Matrix of subdomain usage |
| fem.dim | Multiphysics dependent variable names |
| fem.equ | PDE coefficients |
| fem.bnd | Boundary conditions |
| fem.border | Vector of border on or off |
| fem.usage | Multiphysics subdomain usage matrix |
| fem.init | Initial value |
| fem.sol | Finite element solution |

The field fem.mesh 252 includes the finite element discretization. The mesh partitions the geometrical domain into subdomains and boundaries. Data stored in this field may be created from an analyzed geometry. A mesh structure representing a geometry may also be created by an outside or external application and may subsequently be imported to use in this system in this embodiment. To obtain good numerical results in the solution to a particular multiphysics problem, the mesh may have certain specific characteristics available in connection with an externally provided mesh, such as by a MATLAB routine. In instances such as these, a mesh may be imported from a compatible external source. Support may vary with embodiment as to what external interfaces are supported and what external formats of meshes may be compatible for use with a particular implementation. For example, a mesh structure may be compatible for use with an embodiment such as a mesh structure produced by the product TetMesh by Simulog, and HyperMesh by Altair Engineering.

In one embodiment, a geometry is used in generating a mesh structure. In other words, in an embodiment that includes functionality to define and create a mesh as an alternative to obtaining a mesh, for example, from an external compatible software product, a geometry definition may be used in generating a mesh structure. What will now be described is a function that may be included in an embodiment. An embodiment may include any one or more of a variety of alternatives to represent a geometry of a PDE problem to be solved. One technique includes defining a geometry in accordance with a predefined file format, predefined formatted object, and the like. It should be noted that an embodiment may include the option of importing a predefined file format or specifying a function for describing the geometry.

It should be noted that the predefined file format may include differences in accordance with the varying dimensions that may be supported by an embodiment.

An embodiment may include a function or routine definition for returning information about a geometry represented in accordance with a predefined file format. This routine may be included in an implementation, or, may also be defined by a user. In other words, an implementation may include support allowing a user to provide an interface function in accordance with a predefined template or API, such as particular input and output parameters and function return values. Such a routine may be used as an interface function, for example, to obtain geometry information in which a geometry may be represented in any one of a variety of predefined file formats, data structure formats, and the like.

The fem.mesh structure may represent a finite element mesh that is partitioning a geometrical domain into simplices. In one embodiment, minimal regions may be divided into elements and boundaries may also be broken up into boundary elements. In one embodiment of the mesh structure, the mesh may be represented by fields of data, two of which are optional. The five fields are: the node point matrix (p), the boundary element matrix (e), the element matrix (t), the vertex matrix (v) and the equivalence matrix (equiv), in which v and equiv may be optional. The matrix p includes the node point coordinates of the mesh. The matrix e may include information to assemble boundary conditions on $\delta\Omega$, such as node points of boundary elements, parameter values on boundary elements, geometry boundary numbers, and left and right subdomain numbers. The matrix t includes information needed to assemble the PDE on the domain $\Omega$. It includes the node points of the finite element mesh, and the subdomain number of each element. The matrix v includes information to recreate geometric vertices. The equiv matrix includes information on equivalent boundary elements on equivalent boundaries. It should be noted that contents and of the data structure may vary with dimension of the domain being represented. For example, in connection with a 2-dimensional domain, the node point matrix p may include x and y coordinates as the first and second rows of the matrix. The boundary element matrix e may include first and second rows that include indices of the starting and ending point, third and fourth rows including the starting and ending parameter values, a fifth row including the boundary segment number, and sixth and seventh rows including left and right hand side subdomain numbers. The element matrix t may include in the first three rows indices of the corner points, given in counter-clockwise order, and a fourth row including a subdomain number. The vertex matrix v may have a first row including indices into p for vertices. For isolated vertices, the second row may also include the number of the subdomain that includes the vertex. For other vertices, the second row may be padded. The field v may not be used during assembly, but rather have another use when the mesh structure, for example, may be used in connection with other operations or data representations. The equivalence matrix equiv may include first and second rows of indices into the columns in e for equivalent boundary elements. The third and fourth row may include a 1 and 2, or a 2 and 1 depending on the permutation of the boundaries relative to each other.

As another example of the mesh structure, consider one that may be used in connection with a 1-dimensional structure being represented. The node matrix p may include x coordinates of the node points in the mesh in the first row. In the boundary element matrix e, the first row may include indicates of the boundary point, the second row may include the boundary segment number, and the third and fourth rows may include left and right hand side subdomain numbers. In the element matrix e, the first two rows include indices to the corner points, given from left to right, and the third row includes the subdomain number. In a 1-dimensional domain, there is no vertex matrix since vertices are exactly equivalent to the boundaries. In the equivalence matrix equiv, the first and second rows include indices into the columns in e for equivalent boundaries. The third row is padded with ones.

In one embodiment, the fem structure may additionally include a fem.equiv field indicating boundaries that should be equivalent with respect to elements and node points, e.g., for periodic boundary conditions. One implementation of fem.equiv includes a first row with master boundary indices and a second row with slave boundary indices. The mesh has the same number of node points for the boundaries listed in the same column. The points are placed at equal arc-length from the starting point of the equivalent boundaries. If a negative number is used in row two, the slave boundary may be generated by following the master boundary from end point to start point. A master boundary may not be a slave boundary in another column.

Following is a summary of the Delaunay triangulation method in connection with forming a 2-dimensional mesh structure:

1. Enclose geometry in a bounding box
2. Put node points on the boundaries following HMAX
3. Perform Delaunay triangulation of the node points on the boundaries and the vertices of the box. Use the properties MINIT/ON and BOX/ON to see the output of this step.
4. Insert node points into center of circumscribed circles of large elements and update Delaunay triangulation until HMAX is achieved.
5. Check that the Delaunay triangulation respects the boundaries and enforce respected boundaries.
6. Remove bounding box.
7. Improve mesh quality.

in which HMAX refers to the maximum element size; BOX and MINIT and other properties that may be used in one embodiment are summarized below:

| Property | 1-D | 2-D | Value | Default | Description |
|---|---|---|---|---|---|
| Box | | X | on/off | off | preserve bounding box |
| Hcurve | | X | numeric | 1/3 | curvature mesh size |
| Hexr | X | X | string | | maximum mesh size |
| Hgrad | X | X | numeric | 1.3 | element growth rate |
| Hmax | X | X | numeric or cell array | estimate | maximum element size |
| Hmesh | X | X | numeric | | maximum element size given per point or element on an input mesh |
| Hnum | X | X | numeric, cell array | | number of elements |
| Hpnt | | X | numeric, cell array | | number of resolution points |
| Minit | | X | on/off | off | boundary triangulation |
| jiggle | | X | off/mean min/on | mean | call mesh smoothing routine |
| Jiggleiter | | X | numeric | 10 | maximum iterations |
| out | X | X | values | mesh | output variables |

The foregoing properties may be used in connection with forming a mesh structure. The Box and Minit properties are related to the way the mesh method works. By turning the box property "on", one may obtain an estimate of how the mesh generation technique may work within the bounding box. By turning on minit, the initial triangulation of the boundaries may be viewed, for example, in connection with step 3 above.

Hcurve is a scalar numeric value relating the mesh size to the curvature of the geometry or mesh boundaries. The radius of the curvature is multiplied by the hcurve factor to obtain the mesh size along the boundary. Hexpr is a string including an expression of x and y giving the size of the elements at different coordinates using the mesh structure. Hmax controls the size of the elements in the mesh. Hmax may either be a global value, or a cell array. The syntax of the cell array varies in accordance with 1-D and 2-D. For 2-D, the first entry in the cell includes a global Hmax, the second entry is a matrix with two rows where the first row includes point indices and the second row includes Hmax and corresponding points. The third entry includes indices to edge segments and corresponding Hmax, and the fourth entry includes indices to subdomains and corresponding Hmax. For a 1-D the first entry in the cell includes a global Hmax, the second entry is a matrix with two rows where the first row includes point indices, and the second row includes Hmax in the corresponding points. The third entry includes indices to the subdomains and corresponding Hmax.

Hmesh is a vector with one entry for every node or element in the mesh given in the mesh structure. Hnum controls the approximate number of elements in the mesh. Depending on other properties, the number of elements specified by Hnum may be exceeded, but at least as many elements specified are generated. Hnum may be either a global numeric value or a cell array. Syntax of the cell array varies with 1-D or 2-D. For 2-D, the first entry in the cell includes a global Hnum, the second entry is a matrix with two rows where the first row include edge indices and the second row includes Hnum on the corresponding edges. For 1-D, the first entry in the cell includes a global Hnum, the second entry is a matrix with two rows where the first row includes subdomain indices and the second row includes Hnum on the corresponding subdomain.

The Hpnt property controls the number of points placed on each edge to resolve the mesh. Additional points may be placed as needed in accordance with the curvature and distances. It is either a number for all edges, or a cell. If it is a cell array, the first entry applies to all edges and the second entry is a matrix with two rows where the first row includes edge indices and the second row includes Hpnt on that edge.

The Jiggle property may be used to control whether "jiggling" of the mesh may be attempted, for example, in using a smoothing technique. This may be performed until the minimum or mean of the quality of elements decreases by setting jiggle accordingly to min or mean. Jiggleiter may be used to specify a maximum number of iterations.

It should be noted that the foregoing properties may be included as parameters to an API for forming a mesh structure, for example, using the Delaunay triangulation method. Other techniques may also be used and the exact parameters in an embodiment using an API may also vary. Additionally, other embodiments may also include other representations of the mesh structure that may vary in accordance with dimension of the geometry.

Referring back to other fields of the fem structure in one embodiment, each application mode has a separate fem.appl{i} field 254, referred to as appl{i}. The index i in the appl vector runs over the set of application modes that have been selected, for example, in connection with FIG. 3. In this embodiment, corresponding to each appl{i} for each selected application mode are five subfields denoted 254a-254e. The appl{i}.dim field 254a includes the names of the dependent variables or physical quantities in application mode i. The appl{i}.equ field 254b includes the physical properties associated with subdomain data, for example as described in connection with FIG. 4. The field appl{i}.bnd 254c includes data describing the physical properties associated with boundary data, for example as described in connection with FIG. 5, for application mode i. The field border 254d is a flag that controls if boundary conditions on inner boundaries are to be considered, and, for example, corresponds to the "Enable Borders check box" as described in connection with the GUI of FIG. 5. There is one border flag for each application mode. The field usage 254e corresponds to the "Activate in this Subdomain check box" as described in connection with the GUI of FIG. 4. In one embodiment, this may be implemented as a boolean vector, with one column for each geometrical subdomain. A logical value of "1" or true in an entry indicates that application mode i is active in the subdomain corresponding to that column. Fem.appl{i}.submode represents a corresponding submode setting, such as 48 of FIG. 3.

In one embodiment, the remaining fields in the data structure 250 may be associated with the combined application modes. The field fem.dim 256 includes the names of the dependent variables or physical quantities in all application modes. The fields fem.equ 258 and fem.bnd 260 correspond to the derived equations and boundary conditions for all the application modes. These fields may be used in connection with data from dialog boxes for PDE and Boundary conditions in coefficient view, such as those GUIs described in connection with FIG. 6. Similarly the field fem.border 262 may be implemented as a vector specifying borders for each variable of the variables in appl{i}.dim separately. The field fem.usage 254e includes data associated with the activation of dependent variables in each geometrical subdomain. The variables in fem.dim 256 correspond to the rows of the fem.usage field 264, and the columns correspond to the geometrical subdomains. The field fem.init 266 includes the initial value for nonlinear and time dependent solvers, for example, as may be used in connection with solving for the PDEs. The field fem.sol 268 may include the solution to the combined system of PDEs using a solution or PDE solving technique, for example, as may be selected in accordance with the GUI of FIG. 7, other parameters included in the structure 250, and the type of PDE system being solved, such as whether the PDEs correspond to a linear or non-linear system, are in coefficient or general form, and the like. The field 270 indicates that other fields may be included in an embodiment in accordance with each implementation.

The equ fields 254b may include several application mode dependent subfields with one list per physical property. Each list entries correspond to the subdomains of the problem. Each subfield may include a list of expression values representing the physical properties involved. For example, the heat transfer application mode includes the list: rho, C, k, Q, htrans, Text, Camb, Tambtrans, corresponding, respectively, to the density, heat capacity, coefficient of heat conduction, heat source, convective heat transfer coefficient, external temperature, user-defined constant, and transversal ambient temperature. This may be interpreted as a heat source of $Q+htrans*(Text-T)+Camb*(Tambtrans^4-T^4)$ on a subdomain.

The usage fields 254e and 264 describe the setting of the Active in this subdomain setting for each physical property (or dependent variable). The bnd fields 254c include several application mode dependent subfields with one list per physical property. The list entries correspond to the boundaries of the subdomain. Each subfield contains a list of expression values for the physical quantities involved, e.g., the heat transfer application mode contains the list: q, h, Tinf, C, Tamb, and T, corresponding to the heat flux and heat transfer coefficient, external temperature, user-defined constant, ambient temperature, and temperature, respectively. An additional subfield, type, controls the basic type of the boundary condition and what physical properties are used on the boundary. For example, referring to the heat transfer application mode, the type may be one of T0, T, q, or q0. T0 indicates a zero temperature; T indicates that the temperature is specified in the field T; and q0 indicates a zero heat flux through that boundary, and q indicates a heat flux of q+h*(Tinf−T)+C* (Tamb^4−T^4) through that boundary.

The border fields 254d and 262 indicate if the internal boundaries between subdomains are to be considered during the solution of the model. In one embodiment, the outer boundaries with respect to the active in this subdomain setting may be ignored. The equ fields 254b and 258, and the bnd fields 254c and 260 may further include an ind subfield. Each of the ind subfields may be implemented as a vector with length equal to the number of subdomains or boundaries. For each subdomain, the corresponding ind vector entry may indicate a domain group, or "0" for no group. For boundaries, each of the subfields bnd.ind may have the corresponding meaning for boundaries. When the ind field is not given, each subdomain or boundary forms a separate group.

Referring back to FIG. 6 in connection with GUI 80, fields in fem.equ 258 and fem.bnd 260 may be modified if they are specified as being applied to the combined PDE system and subsequently modified, for example, using the GUI 80.

Figure 7:
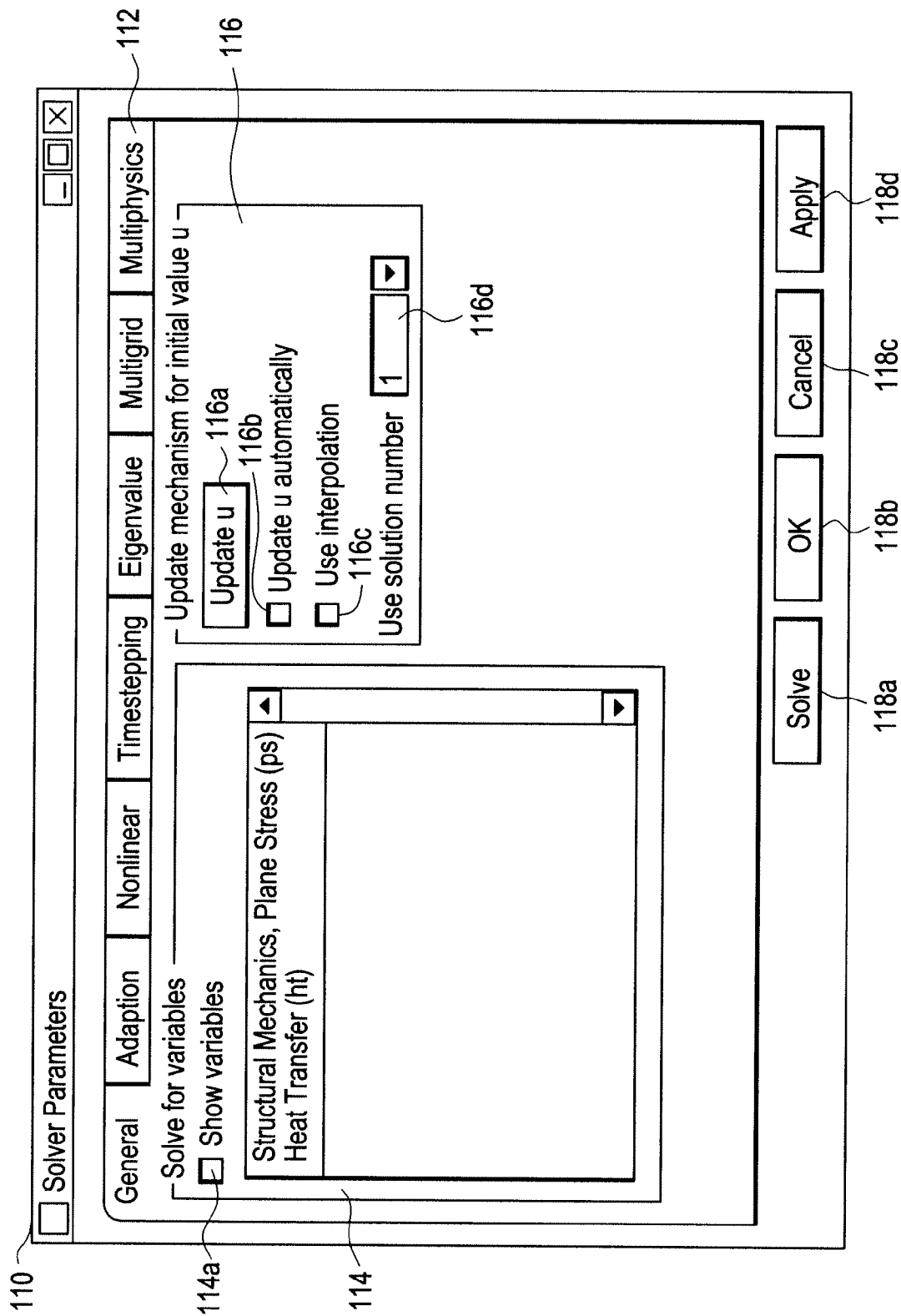
FIG. 7 is an example of an embodiment of a graphical user interface for specifying the ability to solve for any subset of the physical quantities.

Referring now to FIG. 7, shown is an example of an embodiment of a screen display that may be used in connection with solving the PDEs for any subset of physical quantities from any one or more application modes, or of the combined PDE system. The GUI 110 includes a left hand portion 114 displaying the one or more application modes selected with the current combined or multiphysics mode. The "show variables" box 114a, if checked or activated, may modify the content displayed in area 114 to further include dependent variables in each of the associated application modes. In this instance, the physical quantities may be selected as well as a particular application mode with regard to solving for the combined system of PDEs in which the combined system includes those systems corresponding to the application modes in the area 114. The area 116 includes one or more various options that may be associated with solving for the PDEs. In this embodiment, the reference to "u" as included in the area 116 refers to all physical quantities for all application modes. Activating the field 116b causes the updating of the appropriate data structure fields upon solving for the system of PDEs. Activating field 116c uses interpolation in solving for the PDEs. This is described in more detail elsewhere herein.

The GUI 110 may be used in selecting what physical quantities to solve for in the system of PDEs. Selecting all application modes, such as by selection an highlighting application modes of area 114, solves for all physical quantities in the system of PDEs. Selecting a subset of the application modes solves for all the variables in these application modes. In one embodiment, checking the checkbox 114a "Show variables" shows the actual variable names instead of the names of the application mode, and enables selection of these. The "Update u" button 116a inserts the current solution (in fem.sol) into the initial conditions (in fem.init). The check-box "update u automatically" makes u automatically update the data structure fields fem.init with fem.sol each time a solution is computed, and the check-box "use interpolation" 116c allows interpolation to be used when the current solution and the current discretization mesh are different. In one embodiment, the solution may be interpolated to the current discretization and inserted into fem.init. The use of interpolation, for example, is set forth in "Numerical Methods", G. Dahlquist, Å. Björk, Prentice Hall, 1974, ISBN 0-13-627315. The "Use solution number" pop-up menu 116d controls which solution to update fem.init with, for example, if there are several columns in fem.sol as may be for a time-dependent problem.

The values in the physical property fields of the application mode appl structure, for each of the "i" selected application modes, may be converted into PDEs. The formats of the PDEs formed for each specified application mode may be represented as in FIGS. 8 and 9.

Referring now to FIG. 8, shown is an example of an embodiment of formulae 140 describing a system of PDEs in coefficient form. $\Omega$, formula 142, is for a bounded domain. The formulae 146, including 146a-146b $\partial\Omega$, correspond to the boundary of the domain 142. $n_j$ corresponds to the components of an outward unit normal.

The first equation 142 is satisfied inside the domain, and the second and third equations of 146 are both satisfied on the boundary of the domain. The second equation 146a may be referred to as a generalized Neumann boundary condition, and the third equation 146b may be referred to as a Dirichlet boundary condition.

The unknown solutions, such as those corresponding to the physical quantities, may be denoted by $u_k$ in the formulae of 140. The unknown solutions may include one or more components. N denotes the number of solution components, or physical quantities. The solution is allowed to take complex values. $\lambda_m$ is an unknown Lagrange multiplier. $n_j$ is a component of the gradient of the solution. The coefficients included in the formulae 140 $d_{a,l,k}$, $c_{l,k,j,i}$, $\alpha_{l,k,j}$, $\gamma_{l,j}$, $\beta_{l,k,i}$, $a_{l,k}$, $f_l$, $q_{l,k}$, $g_l$, $h_{m,l}$, and $r_m$ may be complex-valued functions of the space, time, and the solution. The coefficients $d_a$, c, $\alpha$, g, $\beta$, a, and f may be functions of the gradient of u.

For a stationary system in coefficient form, for example as may be specified in FIG. 3, item 40, $d_a$=0. With respect to solution components, the coefficients $d_a$, c, $\alpha$, $\beta$, a, and q are N-by-N matrices, and $\gamma$, f and g are N vectors. The coefficient h is an M-by-N matrix, and r is an M vector, where 0<=M<=N and M is the number of constraints. With respect to space dimension, n, (or independent variables) the c coefficient is an n-by-n matrix, and the $\alpha$, $\gamma$, and b coefficients are n vectors. The remaining coefficients may be scalars.

Referring to the indices of the formulae 140, i and j are space indices and k and l are component indices. Using the standard summation convention, i.e., there is an implicit summation over each index pair, i and j, and k and l, the formulae of FIG. 8 where the indices i and j run from 1 to n, the indices k and l run from 1 to N, and where the index m runs from 1 to M. $n_j$ is the jth component of the outward normal vector.

Referring now to FIG. 9, shown is an example of an embodiment of a representation of formulae 150 describing a system of PDEs in general form. Here $\Omega$ 152 is a bounded domain, each $\partial\Omega$, 154a and 154b of 154, is a boundary of the domain, and $n_j$ is the outward unit normal. The unknown solution is denoted by $u_k$ and may include one or more components. N denotes the number of physical quantities. The solution is allowed to take complex values. $\lambda_m$ is an unknown Lagrange multiplier. The generalized Neumann condition, for example as expressed by 154a, includes a source where the Lagrange multipliers $\lambda_m$ are computed such that the Dirichlet conditions become satisfied. The coefficients $\Gamma_{l,j}$, $F_l$, $G_{l,j}$, and $R_m$, may be complex-valued functions of the space, time, the solution and its gradient. With respect to solution components the coefficients $\Gamma$, F and G are N vectors. The coefficient R is an M vector, where $0 \leq M \leq N$, and N is the number of constraints. The $\Gamma$ coefficient is an n vector with respect to space dimension n. The rest of the coefficients are scalars with respect to space. Using j as a space index, and k and l as component indices in conjunction with implied standard summation convention, the general form 150 of FIG. 9 may be expressed where the index j runs from 1 to n, the indices k and l run from 1 to N, where the index m runs from 1 to M, and $n_j$ is the jth component of the outward normal vector.

The application mode physical properties, for example, as described in connection with each selected application mode corresponding to an entry in the appl{I} structure, may be converted to the representation of PDEs in coefficient and/or general form. The combined PDEs may be represented in fields of the data structure 250, such as in the equ 258 and bnd 260 fields.

As described in more detail elsewhere herein, in one embodiment, the same syntactic rules may be used in determining coefficients for both PDEs, as may be represented in the equ field 258, and boundary conditions, as may be represented in the field 260. In other words, as summarized here and described further in more detail elsewhere herein are syntactic rules that may be used in forming coefficients for the PDEs. These rules may be used in forming coefficients for each system of PDEs associated with each application mode. These rules may also be used in connection with forming coefficients for the combined PDE or multiphysics system. The coefficients may be stored in nested lists. Each nested level of the lists may correspond to a nesting index position. For example, level 1 may corresponds to subdomain/boundary, level 2 may correspond to a solution component or physical quantity, and level 3 may correspond to the space coordinate. Level 4 may be a value level, where the actual expressions are stored. In connection with forming coefficients for each application mode selected, input data, as may be obtained in connection with previously described GUIs, may be converted to PDE format. Coefficients may be formed as part of this process. Data for each application mode may be stored in fields of the appl{i} data structure subfields dim, form, equ, bnd, and init.

For the combined or multiphysics, referring back to fields of the data structure 250 described in more detail elsewhere herein, the following list provides the position in the data structure 250 for the combined system of PDEs and boundary conditions with regard to those elements referenced, for example, in FIG. 8: $d_a$: equ.da, c: equ.c, $\alpha$: equ.al, $\gamma$: equ.ga, $\beta$: equ.be, a: equ.a, f: equ.f, q: bnd.q, g: bnd.g, h: bnd.h, r: bnd.r.

The general form coefficients, for example as described in connection with FIG. 9 and FIG. 11 in more detail elsewhere herein, $\Gamma$, F, G, and R may be stored in the equ.ga, equ.f, bnd.q, and bnd.r fields, respectively. A uniform format may be used for each of these coefficients. Subdomains and boundaries may be merged into groups where the expressions for the PDEs and boundary conditions are the same.

A subfield equ:ind of field 258 may be a vector with length equal to the number of subdomains. For each subdomain, the corresponding entry designates a subdomain group or 0 for no group. Similarly, the field bnd.ind has the corresponding meaning for boundaries. When the ind field is not given, each subdomain or boundary form a separate group.

The data structure field fem.border 262 controls if assembly of boundary conditions are performed on borders. In one embodiment, this may be implemented as one or more boolean conditions each representing two states: "on" and off". Setting fem.border 262 to "off" (default) turns off assembly on borders, and setting fem.border to "on" turns on assembly on borders. An embodiment may implement fem.border 262 as an array of text strings with either on or off conditions specified, or a vector of logical values. The length of the array or the vector may be equal to the number of dependent variables. A border for a given dependent variable has that variable activated by fem.usage on each side.

What will now be described are formal rules of one embodiment for determining coefficients at varying levels. Given a PDE or boundary coefficient P1 with L subdomains/boundary groups and N solution components, n space coordinates, with a varying number of levels, such as 1-4 having corresponding coefficient leveling notation P1-P4, respectively, the formal rules for coding the coefficients at varying levels in one embodiment may be represented as:

Level 1 (subdomain/boundary level): If P1 is a cell array then each element of P1 is a P2, otherwise P1 is a single P2. The number of P2s in P1 is either 1 or L.

Level 2 (solution component level): If P2 is a cell array then each element of P2 is a P3, otherwise P2 is a single P3. If P2 is a $d_a$, c, $\alpha$, $\beta$, a, or q coefficient the number of P3s in P2 is 1, N, N(N+1)/2, or $N^2$. If P2 is a $\gamma$, f or g coefficient the number of P3s in P2 is 1 or N. If P2 is an h coefficient the number of P3s in P2 is 1 or MN, where M is an integer between 0 and N, representing the number of constraints. If P2 is an r coefficient the number of P3s in P2 is M.

Level 3 (space-coordinate level): If P3 is a cell array then each element of P3 is a P4, otherwise P3 is a single P4. If P3 is a c coefficient, then the number of P4s in P3 is 1, n, n(n+1)/2, or $n^2$. If P3 is an a, f, q, g, h, r, or da coefficient, there is one P4. If P3 is an $\alpha$, $\gamma$, or $\beta$ coefficient, there are "n" P4s.

Level 4 (value level): A single item including a symbolic text expression for computing PDE coefficient values. The expression may be evaluated where the variables xi, sd, ui, uixj, and h correspond, respectively, to representing the ith coordinate, subdomain label, ith solution component, jth derivative of the ith solution, and the local element size. ui and xj may refer to the variable names defined by fem.dim 256 and fem.sdim (independent variable names or space coordinate names), respectively. It should be noted that fem.sdim may be an additional field included in the portion 270 of data structure 250 in an embodiment.

What will now be described is one embodiment of a method for converting application mode physical properties on subdomains and boundaries into a PDE form, either general or coefficient. In other words, once data is input and stored in the structure 250, this data may be expanded or transformed into another form used in subsequent processing steps. In other words, the following may be used in connection with converting GUI data into PDE format for each application mode.

It should be noted that in the following example, the GUI or input data is stored in a temporary or tmp structure for each application mode. The combined system of PDEs may be formed using as input each of the tmp structure for each application mode. An embodiment may store a representation of the combined PDE system in the fem structure as described in more detail elsewhere herein.

The application mode properties in the fields equ and bnd in the appl{i} structure are rewritten as symbolic expressions by using an application mode dependent set of transformation rules, e.g., for heat transfer:

tmp{i}.equ.c{j}=appl{i}.equ.k{j};
tmp{i}.equ.a{j}=appl{i}.equ.htrans{j};
tmp{i}.equ.f{j}=appl{i}.equ.Q+appl{i}.equ.Text{j}+
 appl{i}.equ.Camb{j}*(appl{i}.equ.Tambtrans{j}^4-
 appl{i}.dim^4)
tmp{i}.equ.da{j}=appl{i}.equ.rho*appl{i}.equ.c{j} by looping over the subdomain index j. The field appl{i}.dim is the physical quantity, the temperature. Similarly the boundary subdomain properties are rewritten by the rules:
tmp{i}.bnd.q{j}=appl{i}.bnd.h{j};
tmp{i}.bnd.g{j}=appl{i}.bnd.q{j}+
 appl{i}.bnd.h{j}*appl{i}.bnd.Tinf{j}+
 appl{i}.bnd.Const{j}*(appl{i}.bnd.Tamb{j}^4-
 appl{i}.dim.^4);

when the type is QG and as
tmp{i}.bnd.h{j}=1;
tmp{i}.bnd.r{j}=appl{i}.bnd.T{j};

when type is T. The remaining type cases, QG0 and T0, are simple cases of the above cases, where all left hand side terms are zero, except the bnd{i}.h term.

It should be noted that the foregoing rules to produce symbolic expression may vary with application mode. For example, the foregoing rules may be used in connection with forming coefficients for heat transfer application mode. As known to those of ordinary skill in the art, the techniques may be applied to forming coefficients for other application modes. It should be noted that functionality associated with the above description is included in one embodiment as a function "appl2fem" as described in the FEMLAB V1.1 Reference Manual from Comsol AB, 1999.

The foregoing may be performed for each of the application modes, i, to expand or transform data into PDE form data included in the application mode structure tmp {i}. This structure tmp {i} includes a representation of the physical properties as instances of the PDE formulae of FIG. 8 or FIG. 9.

The fields usage and border for the tmp data structure may be copied from the corresponding fields in the data structure 250. The field dim 256 may be updated with another variable name, and introduce a relation between the physical quantity and the dependent variables, and introducing this relation when the equ and bnd fields are transformed into the tmp structure.

The submode setting described elsewhere herein in more detail, for example, in connection with FIG. 3, may be used in determining the number of variables. The submode setting may be used to distinguish between a stationary and time-dependent problem. In certain application modes, such as structural mechanics, the number of dependent variables in the application mode may vary in accordance with a submode setting or selection. For example, PDE formulation as described in connection with FIG. 8 does not provide for a second order time derivative. Thus, for example, in application modes related to structural mechanics, where the displacements are the dependent variables, it may be desirous to add the velocities of the displacements as dependent variables in addition to the displacements. Thus the application mode describing the system may include twice the number of variables for the time-dependent subdomain than for the stationary.

What has just been described are processing steps that may be included in an embodiment in connection with expanding or converting input data, as using the GUIs, into a PDE form, such as general or coefficient.

An embodiment may continue by merging the formulae associated with a plurality of application modes and PDEs into a single system of combined PDEs. Appending the subsystems in the order they are specified in each of the fem.appl 254 creates the composite system. In one embodiment, the affected fields in the data structure 250 structure may include dim 256, form (additional field in area 270 indicating problem form as general or coefficient in this example), equ 258, bnd 260, border 262, and usage 264.

The dim field 256 of the composite system may be obtained by concatenating the dim field lists from each of the application modes appl{i}254. The default form of the composite system is the most general form of the subsystems, where "general" is the most general form, and "coefficient" is the least general form.

The conversion of a PDE in coefficient form to general form is described elsewhere herein. The output form may be "forced" to general form by forcing the conversion also if none of the appl{i} application modes are specified in general form. A value may be stored in an additional field that may be included in an embodiment of the data structure 250, such as an additional field in the area 270, indicating the type of problem form, for example, as one of general or coefficient in this embodiment.

The equ 258 and bnd 260 fields in the data structure 250 may be determined using corresponding fields appl{i} in the application modes, after each application structure has been converted to the representation of the PDEs, and the desired output form, according to FIG. 11. The coefficients in the second row may be deemed "weakly" coupled in the sense that the corresponding coefficients in the composite system are block diagonal. This may limit the coupling between the subsystems. By using general form, however, there are no limitations on the composite system. In this embodiment, the border field 262 in the data structure 250 may indicate a list of on/off, one for each solution component. The usage field 264 may be determined using the usage matrices, such as 254e of each subsystems, by concatenating usage lists as rows in a matrix.

Thus, one technique for combining PDEs may be represented by the following pseudocode-like description:

Gpos=0;

for i=1 to Nappl
 j=Ndim(i);
 for k=1 to Nsub
 fem.equ.da{k}(gpos+(1:j),gpos+(1:j))=
  tmp{i}.equ.da{k};
 fem.equ.c{k}(gpos+(1:j),gpos+(1:j))=tmp{i}.equ.c{k};
 fem.equ.al{k}(gpos+(1:j),gpos+(1:j))=tmp{i}.equ.al{k};
 fem.equ.ga{k}(gpos+(1:j))=tmp{i}.equ.ga{k};
 fem.equ.be{k}(gpos+(1:j),gpos+(1:j))=
  tmp{i}.equ.be{k};
 fem.equ.a{k}(gpos+(1:j),gpos+(1:j))=tmp{i}.equ.a{k};
 fem.equ.f{k}(gpos+(1:j))=tmp{i}.equ.f{k};
 end for k=1 to Nbnd
 fem.bnd.q{k}(gpos+(1:j),gpos+(1:j))=tmp{i}.bnd.q{k};
 fem.bnd.g{k}(gpos+(1:j))=tmp{i}.bnd.g{k};
 fem.bnd.h{k}(gpos+(1:j),gpos+(1:j))=tmp{i}.bnd.h{k};
 fem.bnd.r{k}(gpos+(1:j))=tmp{i}.bnd.r{k};
 end fem.border(gpos+(1:j))=tmp.border(1:j);
 fem.usage(gpos+(1:j),:)=tmp.usage(gpos+(1:j));
 gpos=gpos+j;

end

In the above description, the "Nsub" denotes the number of subdomains in the geometry, "Nappl" denotes the number of application modes, and "Nbnd" denotes the number of boundaries. "Ndim(i)" is the number of dependent variables of the application mode.

The result of performing the foregoing is the data representation of the system of PDEs corresponding to the full multiphysics system of the combined PDEs for the selected application modes. In an embodiment, the above procedure is documented as function "multiphysics" in the FEMLAB V1.1 Reference Manual.

It should be noted that if the systems represented in the structure tmp{i} are converted to general form, the foregoing pseudocode description may be applied to the coefficients, for example, as represented by ga (corresponding to "gamma"), f, g, r.

An embodiment may include storing the data for the PDEs and boundary conditions for each application mode in a more compact format using, for example, the ind field in appl{i}.equ and appl{i}.bnd. In one embodiment, as also described elsewhere herein, the ind fields may be implemented each as a vector with length equal to the number of subdomains or boundaries. For each subdomain, the corresponding entry designates a domain group or 0 for no group. Similarly the field bnd.ind has the corresponding meaning for boundaries. When the ind field is not given, each subdomain or boundary forms a separate group. It should be noted that when using this compact format representation feature and the appl{i}.equ.ind or appl{i}.bnd.ind fields are different for the selected application modes, the ind fields may also be merged or combined into the ind fields in fem.equ.ind (subfield of 258) and fem.bnd.ind (subfield of 260). These fields may have a minimal common set of subdomain or boundary groups. This may be determined, for example, by jointly sorting the groups in the application modes and removing duplicates.

In one embodiment, the solution procedure uses the Finite Element Method (FEM) to solve the system of PDEs in coefficient and general form, for example, as represented in FIGS. 8 and 9. This is described, for example, in "The Mathematical Theory of Finite Element Methods", S. C. Brenner, L. R. Scott, Springer-Verlag, ISBN 3-540-94193-2. This is a well-known procedure, but has been adapted to specifically fit a particular context of one embodiment. In this embodiment, the first equation in FIG. 8, element 142, and the first equation in FIG. 9, element 152, may be multiplied with an arbitrary test function v, and integrated over the domain $\Omega$, such as integrated by parts, for example, using Green's formula. The boundary integral may be replaced using the Neumann boundary condition. Furthermore, the Dirichlet boundary condition may be multiplied by an arbitrary test function $\mu$ and integrated on the boundary, and obtain the variational formulation of the full problem: Find $u_k$ and $\lambda_m$ such that for all v, m, l=1, . . . , N, and m=1, . . . , M the equations in FIG. 12 and FIG. 13 hold, for coefficient and general form, respectively.

As described in connection with one embodiment, the PDE system to be solved may be passed to a solver algorithm for PDEs that uses the finite element method. In addition to the data structure 250 that may include the representation of the PDEs, two sets of constraint matrices may be used and are referred to and described in more detail elsewhere herein in connection with particular features that may be included in an embodiment.

The finite-dimensional function space is the set of piece-wise linear functions on a triangulation $\tau$ of the domain $\Omega$. u and $\Lambda$ may be approximated, for example, using the formulae 304 of FIG. 14, where $\phi_I$ is linear on each element, continuous, and 0 on all node points in the triangulation except the node point I. $\psi_{K,L}$ is a delta function at a vertex L on a boundary element K.

By using the test functions $\phi_J$ and $\psi_{K,L}$ on the weak form of the PDE in coefficient form, it may be determined that the formulae 306 of FIG. 15 applies for all J and l, and that the formula 308 of FIG. 16 apply for all K, L, and m. The finite element discretization represented by 310 of FIG. 18 may be determined. It should be noted that the integrals as included in the formulae 310 of FIG. 18 may be computed using a Gauss quadrature within each element. The formula corresponding to those of 306 of FIGS. 15 and 308 of FIG. 16 for general form may be represented as in formulae 312 of FIG. 17.

With reference to the data structure 250 described elsewhere herein, when the integrals in 310 of FIG. 18 are computed, the initial value in fem.init 266 may be used as values for the solution when it occurs in the expressions in the PDE coefficients and boundary conditions.

By numerically computing the matrices according to the foregoing formulae, the systems of equations represented in FIG. 19 and FIG. 20 may be determined. In particular, referring to FIG. 19, shown are formulae 320 in coefficient form, and referring to FIG. 20, shown are formulae 322 in general form, in which C, AL, BE, A, and Q are $N_pN$-by-$N_pN$ matrices, and F, GA, and G are $N_pN$ vectors. H is a $N_enM$-by-$N_pN$ matrix and R is a $N_enM$ vector. The DA matrix is used in time-dependent and eigenvalue problems. When these matrices are produced, the first index in the index list in FIG. 18 is expanded first.

Linear solvers, nonlinear solvers, time-dependent solvers and eigenvalue solvers may be used in solving systems of PDEs of FIG. 19 in coefficient form, and PDEs of FIG. 20 in general form. Such solvers, or solving techniques, are generally known in the numeric literature, for example, such as in "Numerical Methods", G. Dahlquist, Å. Björk, Prentice Hall, 1974, ISBN 0-13-627315. In one embodiment, a technique may be used to generate the Jacobian for nonlinear solvers and for solvers of time-dependent problems. This technique may be used in systems in general form, or PDE systems that have been converted from coefficient form to general form, for example as described in connection with the formulae 240 of FIG. 11.

It should be noted that use of PDEs in general form may be used to more efficiently provide PDE solutions in solving for non-linear systems of equations. One technique, as described elsewhere herein in more detail, may utilize the general form to derive a Jacobian. This may be more efficient than using the coefficient form for solving for non-linear systems. Using this general form to derive the Jacobian, the Newton method may then be used. FIG. 10 shows an iteration of using the Newton method.

For the combined system or multiphysics, the solution may be stored in the field fem.sol 268 of the data structure 250. In one embodiment, the solution field 268 may represent the solution to a PDE system as a vector having the same number of elements as the corresponding U. Similarly fem.init 266 may include the initial value for the nonlinear and time-dependent solvers. For time-dependent solutions, there may be several columns in fem.sol 268, one for each point in time.

In one embodiment, nonlinear equations in general form may be solved by Newton iterations.

Referring now to FIG. 11, shown is an example of the formulae that may be used in an embodiment in converting from coefficient to general form of the PDEs. The conversion from coefficient to general form may be performed on the app {i} structure for each application mode separately in accordance with the form desired, for example, as may vary in accordance with equation or system type. For example, if a system being solved is in coefficient form and it is a nonlinear system, it may be desired to convert from the coefficient form to general form using the formulae 240 of FIG. 11 in conjunction with the other formulae 140 for coefficient form to produce a system of PDEs of the general form, such as those represented by the formulae 150 of FIG. 9. This conversion may also be performed in accordance with a user selected or specified mode, for example, as may be included in an embodiment. Other embodiments may perform this conversion from coefficient to general form in connection with other function that may be included and vary with implementation.

The formulae 240 of FIG. 11 may be used to derive $\Gamma$, F, G, and R from $d_a$, c, $\alpha$, $\gamma_l$, $\beta$, a, f, q, g, h, and r as included in the formulae 140 of FIG. 8. This may be performed, for example, as by symbolic manipulation of the mathematical expressions.

The discretization by the finite element method, given a nonlinear system of equations in as in the general form of FIG. 20, may be viewed as the problem p(U)=0, where U is the vector of unknown coefficients of the finite element solution to the PDE problem. In this instance, DA=0 since this problem is stationary. The LaGrange multipliers, $\Lambda$, may be considered auxiliary values $\Lambda=\Lambda(U)$ which may be assumed to be eliminated. For the solution of the discretized system, an affine invariant form of the dampened Newton method may be applied: Given an initial guess, $U^{(0)}$; a sequence of iterates $U^{(k)}$ is computed by the iteration formula 326 in FIG. 21, where $J(U)=\partial\rho(U)/\partial U$, and $\lambda_k \in (0; 1]$ denotes a damping factor.

Subsequently solving for $\Delta U^{(k)}$ above may utilize the solution of a linear system of equations. If J(U) is chosen as the exact Jacobian, the iteration formula above may be interpreted as the finite element discretization of a linearized equations in coefficient form by applying the settings in 324 of FIG. 10. The coefficients in the coefficient form PDE may be formed as symbolic derivatives of the coefficients in the general form PDE with respect to the solution, and its gradient.

It should be noted that the "Active in this subdomain feature" for selective inclusion or variation of a variable in a system, may be implemented in one embodiment by adding a constraint to the H and R matrices to not-a-number in IEEE arithmetic. One row containing the constraint may be added to H and R for each node point in the deactivated subdomains and dependent variables.

It should also be noted that when the system of PDEs is assembled, for example, according to FIG. 18, the variables not to solved for may be used in the expressions for PDE coefficients and boundary conditions. In one embodiment, the "solve for variable feature" may be implemented by adding a constraint to the H and R matrices that constrains the solution in the node points the value of the previous solution in the same point, one row containing the constraint is added to H and R for each node point and dependent variable.

The foregoing description may be used in forming a multiphysics model and solving for selected variables. Steps of one embodiment may be summarized in the form of a flowchart and accompanying description.

Figure 22:
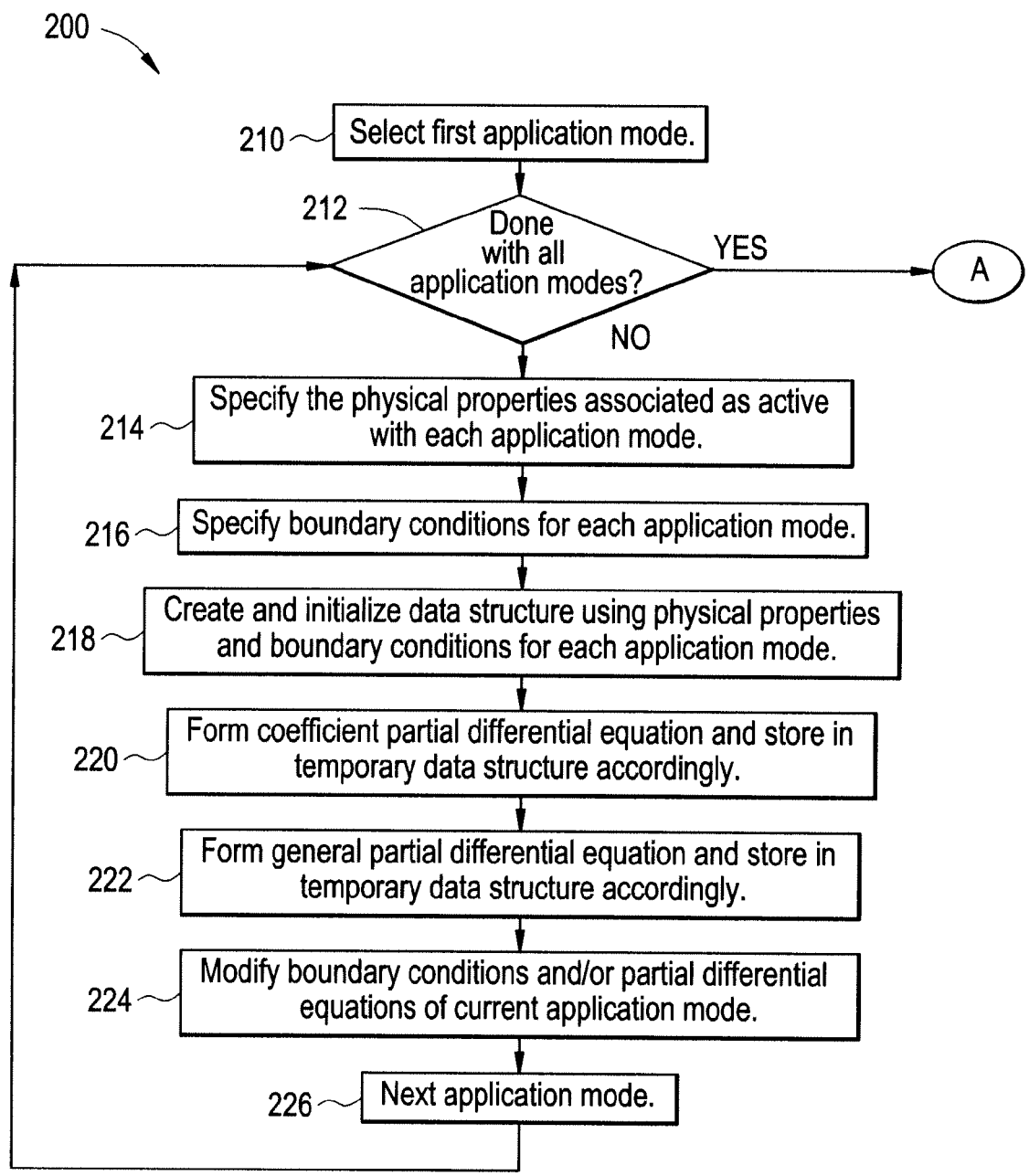
FIG. 22 and FIG. 23 form a flowchart of method steps of one embodiment for specifying one or more systems of partial differential equations, representing them in a combined form, and solving a combined system of partial differential equations.
Figure 23:
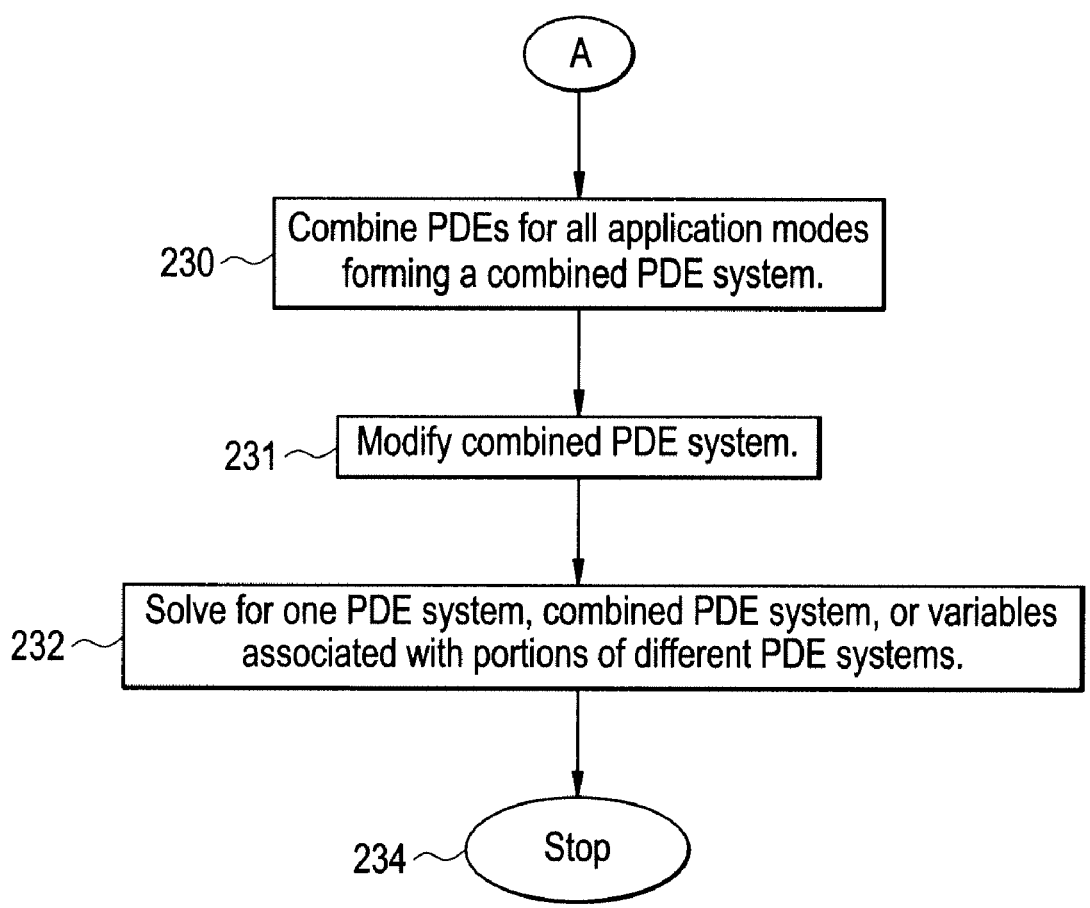

Referring now to FIG. 22 and FIG. 23, shown is an example of an embodiment of a flowchart of steps of one method for automatically specifying one or more systems of PDEs, representing them in a single combined form, and solving a system of PDEs. At step 210, a first application mode is selected. It should be noted that each application mode corresponds to a particular system being modeled. The selection of one or more application modes may be performed, for example, in one embodiment using the GUI 30 of the previously described FIG. 3. At step 212, a determination is made as to whether the processing steps formed by the loop at the top of step 212 are complete for all application modes. If a determination is made at step 212 that processing of all the applications modes selected at step 210, control proceeds to flow point A. Otherwise, control proceeds to step 214, where the physical properties associated as active with the current application mode are determined. The physical properties associated with an application mode may be selected, for example, in connection with GUI 60 of FIG. 4. Control proceeds to step 216, where the boundary condition for the current application mode is determined. The boundary conditions may be determined, for example, using the GUI 70 of the previously described FIG. 5.

Control proceeds to step 218, where data structures are created and initialized using the physical properties and boundary conditions specified for the current application mode in connection with the processing, for example, of steps 214 and 216. At step 220, the coefficient PDEs may be formed using physical property and boundary data obtained in connection with steps 214 and 216, and accordingly stored in the data structure created and initialized at step 218. Recall, as previously described, that the PDE in coefficient view, or form, may be represented as described in connection with the formulae 140 of FIG. 8. Additionally, recall that a temporary data structure may also be used when forming the coefficients for each application mode. At step 222, the general form of the PDE may also be formed. Accordingly, the data structure initially created at step 218 may be updated to include the information about the general form for the PDE system. It should be noted that the general PDE formed at step 222 may be as represented by the formulae 150 previously described in connection with FIG. 9. A temporary data structure may also be used in storing data for the coefficients formed in connection with processing of step 222, similar to that as may be used in connection with step 220.

An embodiment may provide an option to allow for data entry, display and modification in coefficient form, general form, or both of these forms. If more than one is included in an embodiment, there may be a default, or a user selection option. Thus, processing associated with steps 220 and 222 may be optionally performed in accordance with what may be included in an embodiment, and may additionally be in accordance with a user selection. One embodiment provides for data entry, modification, and PDE solving associated with an application mode in either coefficient view or general form. Coefficient view may be selected for data entry and modification with the additional user input selection of producing general form, and solving PDEs using either form. If general form is selected for data entry without coefficient view, PDE solving may be performed, by default, using a system of equation in general form. As known to those of ordinary skill in the art, in accordance with the PDE system being solved, solving using the general form may be more efficient and desired over use of coefficient form. For example, in solving PDE systems for non-linear systems, use of the general form may be more efficient.

At Step 224, an embodiment may include, optionally, functionality to modify the boundary conditions and/or PDEs of the current application mode. It should be noted that if an embodiment includes the function of modifying a PDE for each application mode, the previously described locking mechanism may operate differently since PDEs may change per application mode.

At step 226, a next application mode may be selected. Control proceeds to step 212 where a determination is again made as to whether processing all the application modes is complete.

When all the application modes are selected and done being processed in connection with the processing steps formed by the loop beginning with a decision at step 212, control proceeds to flow point A, step 230, where PDEs for all the previously entered application modes are combined, forming a combined PDE system. In other words, the result is a single PDE system representing the combination of all the previously described systems in connection with all the previously specified application modes. It should be noted that in one embodiment described in more detail elsewhere herein, data associated with the PDE of each application mode may be stored in a temporary structure for each application mode. At step 230, in this instance, the temporary data structures may be used as input for producing the combined PDE system or multiphysics system of PDEs. At step 231, an embodiment may optionally provide for modifying the combined PDE system, or other systems. Control proceeds to step 232, where the PDEs, or variables associated with PDEs, may be solved. An embodiment may provide variations as to what variables or PDEs may be solved for in the processing of step 232. One embodiment may allow the user to select solving for one of the PDEs associated with individual application modes, the combined PDE system, or variables from different PDEs. Control proceeds to step 234 where the processing of the flowchart 200 stops.

What has just been described is the general processing of the overall system for automatically forming one or more sets of PDEs associated with one or more application modes or systems. These systems may be combined into a single, combined PDEs system. A programming module, such as the finite element solver that may be included in the Modeling and Simulation Module 222, may solve a system of PDEs. The finite element solver, for example, may solve a single system of PDE corresponding to a single application mode, may solve for the combined PDE system, for example, as computed or determined in connection with the processing step 230. An embodiment may also solve for one or more variables associated with one or more application mode using any one a variety of known solving techniques.

What will now be described in more detail is how user defined application modes and user defined applications may be used in the foregoing system and with the techniques described herein. Generally, a user defined application mode in one embodiment may be an equivalent to a predefined application mode, such as heat transfer, described elsewhere herein. An "application mode" is distinguishable from an "application". In this embodiment, an application may be associated with a user defined subclass from a class, for example, that may be associated with an application mode. An application may be defined by a user, for example, when it may be useful to create a specialized or narrower definition of an existing class corresponding to an application mode. In this way, routines and code common in more than an application may be shared since, fore example, in this embodiment, functionality of one or more applications (subclasses) may be inherited from an application mode.

Alternatively, a user-defined application mode rather than a user defined application may be more appropriate, for example, when such functionality is not common or bears little or no relationship in functionality to an existing application mode.

In one embodiment, an application mode may be predefined, such as Diffusion or Heat Transfer included in one embodiment of the software 19, or user-defined. User-defined application modes may be created using an Application Program Interface (API), such as those described in the FEMLAB V1.1 Application Program Interface manual. In contrast to the user defined application mode is the user-defined application. A difference between the user-defined application mode and user-defined application is that a user-defined application may be much more specialized, for example, regarding the geometry, modeling, meshing and the GUI appearance. Use of the API allows users to add new functionality to FEMLAB or remove functionality in order to tailor software of an existing application mode to better fit a particular use as may be associated with a particular user-defined application.

In one embodiment, a user may create and define a user-defined application mode and application. These may be created using classes and subclasses in connection with an object oriented approach in which use of objects and classes allows for the addition of new data types and operations, for example, as may be implemented using MATLAB. The operations and functions that operate on class objects are known as methods collected together in a class directory. The class directory includes a constructor for that class. Generally, a predefined application mode, such as one for heat transfer, may be created as a class. A user defined application may be defined as a subclass of one of these classes. In this manner, the functionality of an existing application mode may be inherited by a new user defined application with additionally having some or all of its functionality overloaded by a subclass allowing for a user to create an application with desired behavior. An application mode may also be defined a the same level as the predefined application modes, such as heat transfer. These user defined application modes may have the same status and use as the predefined application modes. In particular, both predefined and user defined application modes may be used as one of the application modes, for example, when forming a combined multiphysics system as described in more detail elsewhere herein.

An application mode may be created as a class. These classes may be represented in a hierarchical structure. There are a set of base classes at the top of a hierarchy containing the main functionality. The application modes may inherit from base classes, sometimes through convenient intermediate classes that may include methods defining functionality common to several application modes. An example of the class hierarchy may be found in FIG. 24, element 500, as described in more detail elsewhere herein. An application mode may be created by defining parameters on the boundary and the inner domain that will define the equations to be solved, and how to specify these parameters in the GUI. For more streamlined design of the application modes, the available solvers and the initial conditions, post processing expressions, and name of dependent and independent variables may also be modified.

An application mode has a constructor, for example, such as in connection with FIG. 28 described in more detail elsewhere herein. The information for an application mode may be stored in the application mode object and in the fem.appl structure also described elsewhere herein. Table 510 of FIG. 27 includes properties that may be included in one embodiment of an application mode object. These properties are either inherited from the parent objects, or may also be set explicitly. Table 514 of FIG. 29 includes a listing of the methods that may exist either directly in the application mode class, or in any of the parent classes. The column to the right in this table 514 describes what the methods do.

Additionally, a set of methods may be used by the GUI to set up solvers and dialog boxes as well as submodes for the application modes. In one embodiment, these methods are:

| | |
|---|---|
| bndinfo | sets up boundary conditions dialog box |
| equinfo | sets up PDE coefficients dialog box |
| pdeinfo | contains info about available solvers, solution forms, and submodes |
| sub_conv | gives the relation between old and new variables when changing submode |

Other important methods are the set and get methods that allows for setting and getting of the application mode object properties.

In one embodiment, to define a user-defined application mode, a minimum set of definitions and routines or methods are defined. These include the constructor, appspec, bnd_compute, and equ_compute. appspec is a routine for defining the parameters used in the interior and on the boundaries. Routines equ_compute and bnd_compute define how to set up the equations based on this information from appspec.

In order to use the application mode from the GUI the equinfo and bndinfo methods may be implemented in the application mode class. These methods define how to set up the dialog boxes in the GUI for specifying the parameters.

In contrast to a user-defined application mode is a user-defined application. In the user-defined application, for example, overloading may be performed of some or all of the above methods, in addition to the methods for setting up the GUI, for example, such as fldrawmode, flboundmode, flpdemode, flmeshmode, flsolvemode, flplotmode in connection with set up some of the menus and toolbars for draw, boundary, PDE, mesh, solve and plotmode, respectively.

Figure 24:
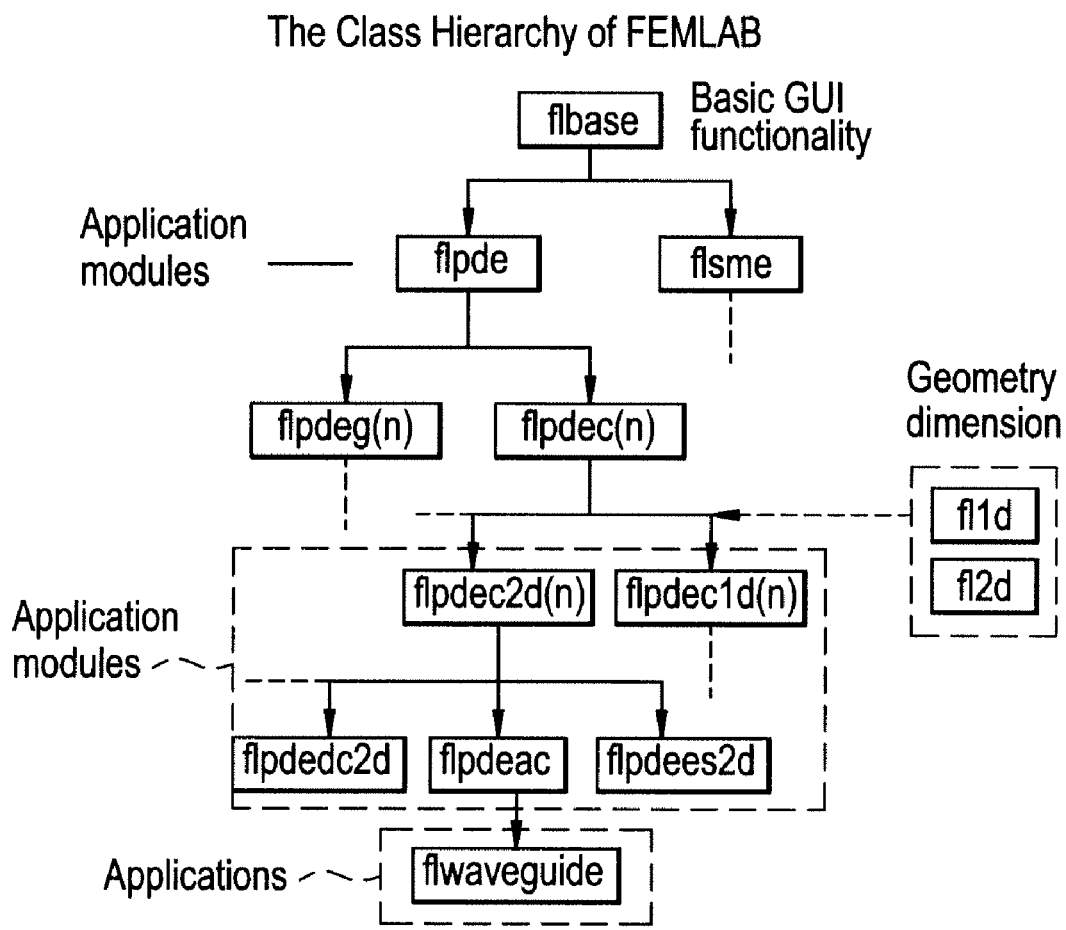
FIG. 24 is an example of a representation of a class hierarchy that may be included in an embodiment in connection with predefined and user defined application modes.

Referring now to FIG. 24, shown is an example of a class structure that may be included in an embodiment in which a user may define application modes. At the base of the class structure is the class flbase to facilitate overloading of generally provided functionality that may be included in an embodiment. The application mode object structure may divide the application mode objects in accordance with two particular criteria: geometry dimension and application modes. For geometry dimension, there are two geometry dimension dependent base classes fld1 and fld2 in which methods may implement dimension dependent functionality, such as draw mode menus, toolbars, mesh drawings, and the like. For application modes, there are three application module base classes of: flpde, which is the parent of all application modes, flsme and flcem which are other classes that may be defined in accordance with other modules and associated functionalities. In flpde, all functionality may reside that is common to all application modes and that is also not dependent on geometry dimension. All application modes may be implemented as subclasses to this class. Additional application-dependent classes may be added to support new applications. They may, for example, be implemented as subclasses of flpde or another application mode. In these class directories, methods that implement application dependent functionality, such as specific dialogue box information, and the like may reside. Referring to the structure of the hierarchy illustrated in 500, the application dependent classes take precedence over the geometry dimension classes which also take precedence over the application module class so that, for example, a mesh drawing method in the flpde class may be overridden by the generic 2-D mesh drawing method. Note that the structure 500 may be only a portion of the entire class structure included in an embodiment.

Together with methods, the application objects may define specific properties and behaviors that define an application in the GUI. Referring to FIG. 25, shown are sample 1-D (one-dimensional) application modes 502 and 503. In combination, these two tables may define all predefined application modes included in one embodiment. All 1-D application objects inherit from the application module base class flpde and the geometry class fl1d.

Referring now to FIG. 26, shown are 2-D (two dimensional) application modes that may be defined in an embodiment. The application modes defined in 506 and 508 may include all application modes for 2-D application mode objects. All 2-D application mode objects may inherit from the application module base class flpde and the geometry base class fl2d. All of these classes are subclasses of fl2d and an application mode class. The application mode classes, in turn, are subclasses of flpdec or flpdeg that represent the coefficient and general PDE form, respectively. Note that the PDE mode classes flpdec1, flpdeg1d, flpdec2d and flpdeg2g all accept the number of dependent variables as an input argument thus enabling the creation of PDE modes with an arbitrary number of dependent variables. Calling the constructor function without a dimension argument results in a scalar application mode object.

Referring now to FIG. 27, shown is an example of properties of one embodiment of an application object. Table 510 describes various properties of application objects. Parent is string containing the name of the object class parent. The dim, name and parent properties are initialized explicitly using the application class constructor. Other fields may be inherited by the parent class but may also be initialized using the constructor.

In one embodiment, the application being defined by a user may be a subclass to one of the application mode classes. In one example, suppose a user wants to define a new application, myapp, based on the 2-D heat transfer mode flpdeht2d. A subdirectory may be created in a MATLAB path called @myapp. An example of a constructor may look as in the code snippet 512 of FIG. 28. In this example, the settings for submode, form, tdiff and sdim are from the parent class flpdeht2d. The dim property is explicitly set to be default as may be defined by the method default_dim.

In this embodiment that may use MATLAB, the behavior of MATLAB operators and functions for object arguments may be changed by overloading the relevant functions. This may be accomplished by defining a replacement method with the appropriate name residing in the new class directory at the application level. A user may minimize the number of overloaded methods in an application class being defined by a user by choosing the most appropriate application mode as its parent class. By using the overloading functionality, parts of an existing application may be modified to create application dependent functionality. For example, portions of a GUI, including menus, toolbars, and the like, may be modified to better fit an application as well as methods for overloading the equation definitions.

One embodiment may include a set of methods to provide a portion of the functionality. Referring now to FIG. 29, shown is an example of an embodiment of a portion of functions that may be included in one embodiment. The functions 514 may determine the variables and equations defining a problem. As described in more detail elsewhere herein, it should be noted that the appl field of the fem structure includes application dependent data. Appl is a cell array that contains more than one application mode for multiphysics problems. The foregoing methods may work in connection with a GUI and from the command line. The conversion from the application mode structure in the appl field(s) may be performed by invoking a function called the multiphysics function, which in turn uses another function to compute the equ, bnd, init, dim, usage, border, var, and form fields.

API functions may be included in an embodiment, for example, to allow for adding menus and toolbars to the existing GUI. Additionally, overloading methods may be used, for example, to disable certain functionality associated with a method or provide for an alternative.

Figure 30:
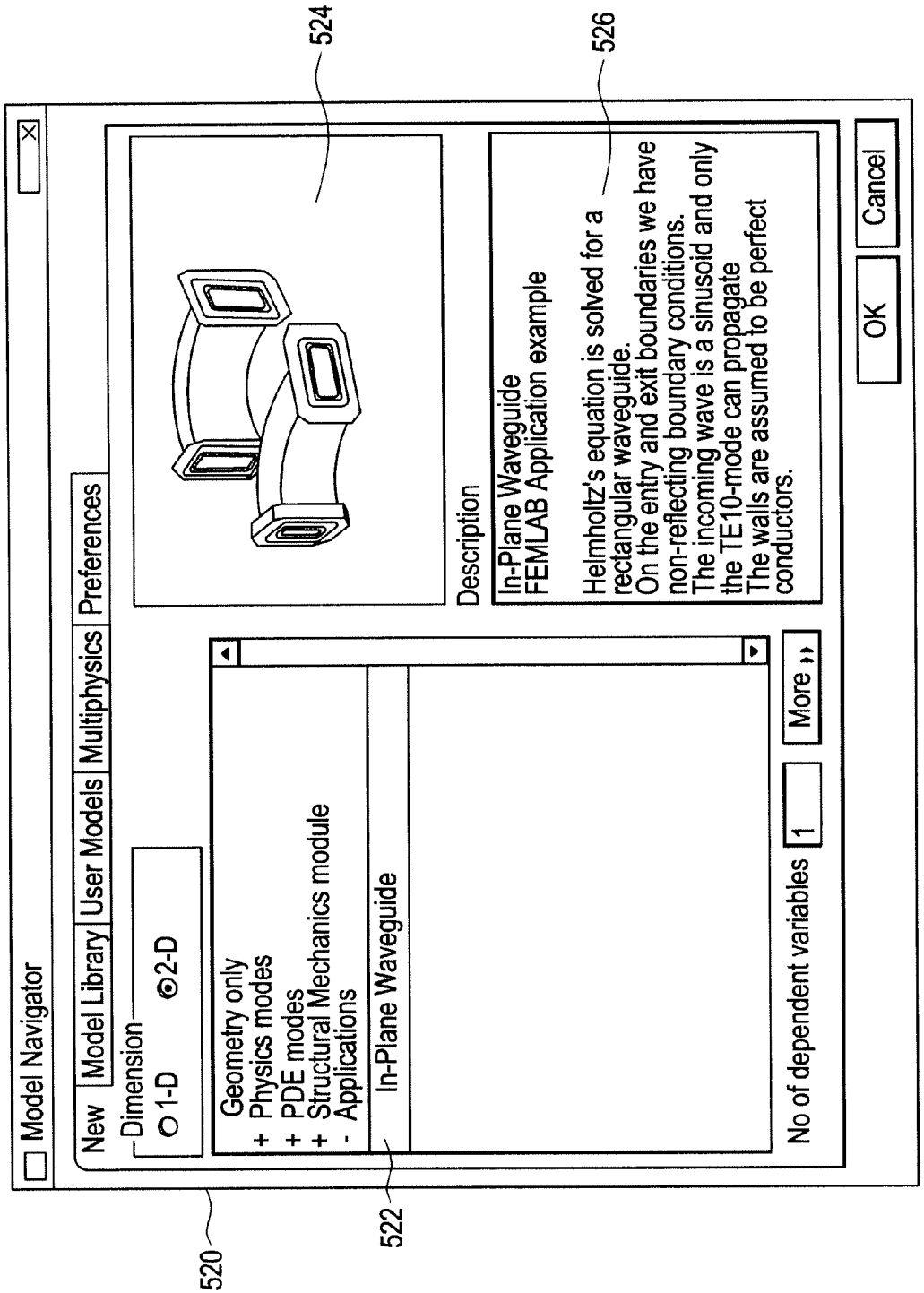
FIG. 30 is an example of a GUI that may be displayed in connection with a user-defined application.

Referring now to FIG. 30, shown is an example of a GUI that may be used in connection with adding an application to the existing GUI. Using the New tab in the GUI 520, a user may browse through the applications. The procedure of adding a new user-defined application may be performed using an API function, for example, fladdappl. Using such an API, an application may be added to the application tree and, optionally, associated text and figure. The description and figure may be displayed when the user defined application is selected. For example, the GUI 520 has a user defined application of "IN-PLANE WAVE GUIDE" selected in 522. Accordingly, an associated image is displayed in 524 and text in 526.

What will now be described is another example of a user-defined application for modeling transmission signals with frequencies in the microwave range, for example, as may be used in the telecom industry. The waves are transmitted through a waveguide with a rectangular cross section. If the wave is bent, the elbow may cause scattering effects preventing the wave from being transmitted through the waveguide. In the following model, a TE wave is modeled in which there is no electric field in the direction of propagation. The dimension of the waveguide and frequency are chosen so that the only mode that can propagate is the $TE_{10}$ mode, that is where the electric field has only one non-zero component that is sinusoidal and vanishes at the walls of the waveguide.

A waveguide may be designed to transmit only frequencies in a narrow band. This band-pass effect may be achieved using a resonance cavity formed by putting conducting posts protruding into the waveguide. The posts may be, for example, metal screws or tuning screws. Equations used to calculate effects may be derived from the wave equation. Time may be eliminated assuming a harmonic planar wave resulting in Helmholtz equation for non-zero electric field component as represented by equation 530 in FIG. 31 in which k is the wave number in the propagating direction. The relation between the wave number k and the frequency f and wavelength $\lambda$ is represented by equation 532 in which c denotes the speed of light.

In this instance, there are three kinds of boundary conditions in the model. At the entrance boundary in which there is a vertical line at x=0, there is an absorbing condition with an incoming sinusoidal wave as in equation 534. The right hand side of 534 is the driving force of the incoming wave. d is the width of the waveguide and yo is the y coordinate of the lower left corner of the waveguide. The wave number depends on the wave number in the direction of propagation ky as in 536. 536 may be derived from solving analytically for a straight waveguide the wave number in the transversal direction may be defined by twice the width of the waveguide. This results in the final expression for the wave number in the propagating direction as a function of the incoming wavelength and width of the waveguide according to 538. At the exit boundary there is an absorbing condition represented as 540 and the walls are assumed to be perfect conductors so that the tangential component of E vanished as in 542. The velocity of light may be calculated from the material parameters and the wavelength is calculated from the frequency and velocity. The cut-off frequency may be calculated from the analytical solution of a straight waveguide as in 544. No waves below this frequency are transmitted through the waveguide.

Using the foregoing waveguide and techniques disclosed herein, the foregoing complexity may be hidden using a GUI. A feature called frequency analysis may be implemented in connection with the waveguide application. What will now be described is an overview of how this may be implemented in one embodiment.

The draw mode for this feature may be implemented using overloading to implement an alternative draw menu and corresponding toolbar buttons. Toolbar icons may be stored in the application class directory as bitmaps. In this example, the draw menu is an alternate menu that includes 5 items: draw mode, straight waveguide, elbow waveguide, geometry parameters and the standard draw menu item Properties. The draw toolbar contains the toolbar buttons straight waveguide, elbow waveguide and geometry parameters. In connection with each of the waveguides, a corresponding figure or image may appear in the GUI. Parameters may be varied in accordance with each of the waveguides by overloading existing methods, for example, by overloading an existing method objdlg in which the geometry is parameterized and the parameters may be stored in a user defined portion of the fem structure on creation. It should be noted that this is a portion of memory allocated for use by the user and not used in this example by the existing methods. Additionally, other functionality may be disabled using overloading, such as to disable importing geometries and cut and paste functionality.

Boundary conditions are "hardwired" according to the equations depending on parameters, for example, as may be defined in the PDE specification GUI. The Boundary menu and related mode buttons may be completely removed using overloading of existing methods. Existing methods are used to define the boundary conditions. Some of the standard PDE mode menu items are removed by overloading the existing method(s). The mesh mode remains the same. Similarly, other modes that are defined and there GUIs, toolbars and the like, may be used and techniques, such as overloading, may be used to implement these as may be desired in accordance with this example and others.

In connection with the waveguide, due to the conversion of time-dependent PDE to a harmonic wave equation, the existing application mode AC Power Electromagnetics mode may be used. The new waveguide application being defined may be implemented, for example, as a subclass to its class, @flp-deac. the waveguide class, named @flwaveguide, may be created on the same directory level as the parent class @flp-deac. An example class constructor is included in 550 of FIG. 32.

Parameters of the waveguide may be specified as in 552 of FIGS. 33 and 554 of FIG. 34. The entrybnd and exitbnd fields may be used by a bnd_compute method to set the appropriate boundary conditions. The startpt field may be used to define the incoming sine wave on the entry boundary. The freqs field includes the frequency vector that may be used by the frequency analysis feature.

The geomparam structure is a 2 element structure array including geometry parameters for straight and elbow waveguides that may include fields as in 556 of FIG. 35. The geometry boundaries may be formed by a set of existing objects using the parameters entrylength, exitlength, width and radius. These existing objects may be combined into a single new geometry object using, for example, an API that forms a single object that is a cell array containing the existing objects.

If the resonance cavity is operative, such as by checking a resonance cavity checkbox on one of the GUIs, the protruding posts are subtracted from the geometry. In this instance, the posts may be creates as a set of solid rectangular objects using the specified cavity parameters. The resulting mapping matrices representing this subtraction result may relate the curve and point indices in the input geometries, respectively, to their new indices in the new geometry object. Knowing the order in which the basic object were created to make the new geometry, the index corresponding to each of these basic objects in the final geometry may be calculated and stored in the user structure.

Of the existing methods previously described in connection with 514 of FIG. 29, 6 may be overloaded. These may include, for example: default_equ, equ_compute, default_bnd, bnd_compute, default_var, and posttable. Equ_compute returns the PDE coefficients computed from parameters defined in the appl.equ structure. The ind field includes 1 since there is only one subdomain. Default_bnd method defined default boundary conditions. Bnd_compute computes boundary conditions from the material parameters and the frequency defined in appl.equ. The entrybnd, exitbnd, and startpt fields in the fem.user structure are used to place the correct boundary conditions on the correct boundaries. Default_var returns an empty cell array disabling default scalar variables. It should be noted that this method may have been used to define the incoming frequency as a scalar sub-domain-independent variable instead of as part of the appl.equ structure. In this instance, the frequency may be specified in connection with a different dialogue box, such as Application Scalar Variables rather than in connection with the PDE specification dialogue box. In posttable, the post processing data is defined. The output variables, descriptions an evaluation expressions may be defined.

Following is an overview of the overloaded GUI methods in the Waveguide application. It should be noted that the following GUI methods may be included in one embodiment. Other embodiments may include other methods or variations of these. Method appspec may be used to define the variable names in the bnd and equ structures of the fem.appl field. appspect for the waveguide may return a structure including fields defining the PDE variables to be scalars and the boundary variables to be boundary coefficients of problem dimension. This information may be used by the appl2fem routine, for example, as described in the FEMLAB V1.1 Reference Manual, FEMLAB V1.1 User's Guide, and FEMLAB V1.1 Model Library, by Computer Solutions (COMSOL) Europe AB. Parts of other functionality described herein may also be fund in the foregoing documentation. This information may also be used by the PDE specification dialogue box. The method pdeinfo is used to define the default abbreviation for an application. Only the standard submode, coefficient form and stationary linear solver are available. The equinfo method returns equations, descriptions and parameter names to be displayed in connection with the PDE specification dialog box. The returned cell array of equations in this instance includes one equation due to the stationary linear solver being the only solver. The flboundmode method removes the standard Boundary menu from the GUI and the corresponding boundary mode toolbar is removed from the flviewtbg method. The importing of geometry objects may be disabled by the flimpmenu method returning an empty structure. Flmphmenu removes the multiphysics menu from the GUI by also returning an empty structure of menu handles. The flp-demode method returns a PDE menu structure including only 2 items, PDE mode and PDE specification. flsolvemode method returns a Solve menu structure includes the items solvemode, solveproblem, frequency analysis, and parameters. flmeshcolvtbg replaces the standard restart button with a frequency analysis button in which a corresponding icon is stored as a bitmap in a directory. Similarly, methods in connection with the geometry parameters, initial conditions and the like are modified and/or disabled in accordance with the desired GUIs and functionalities for the waveguide mode. Finally, the waveguide application may be added to the model navigator, such as in connection with the GUI displayed in FIG. 3, by invoking a function. In one embodiment, the following is an example invocation:

fladdappl('flwaveguide', 'In-plane Waveguide')

in which a bitmap flwaveguide.bmp may reside in a class directory. The bitmap may be displayed to the right of the Model Navigator as previously illustrating in connection with GUI 520 of FIG. 30.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed in a computer system with at least one physical computing device for producing a model of a combined physical system having physical quantities by representing physical quantities of said combined physical system in terms of a combined set of partial differential equations, said method comprising:

representing at least one of a plurality of physical systems as two or more selected application modes modeling physical quantities of said at least one of said plurality of physical systems, wherein said application modes are configured to model the physical quantities for at least one of structural mechanics properties, fluid dynamic properties, electromagnetic properties, chemical reaction properties, acoustic properties, and heat transfer properties of said physical system;

using a first physical computing device, determining a set of partial differential equations for each of said two or more selected application modes, parameters of said partial differential equations being physical quantities of corresponding ones of said plurality of physical systems;

using said first physical computing device or a second physical computing device, forming said combined set of partial differential equations using said determined sets of partial differential equations associated with said one of said plurality of physical systems; and outputting to a display device or a communication device said model of said combined physical system based on said combined set of partial differential equations for said two or more selected application modes for said one of said plurality of physical systems, whereby said model represents a mathematical expression of said physical quantities of said combined physical system.

2. The method of claim 1, further comprising:

storing said output of said model of said combined physical system in a computer readable memory or in a computer readable storage system located within said first physical computing device or said second physical computing device.

3. The method of claim 1, further comprising:
representing at least one of said physical quantities of a first of said plurality of application modes using at least one dependent variable in said set of partial differential equations corresponding to said first of said plurality of application modes.

4. The method of claim 3, further comprising:
representing said at least one of said physical quantities directly as said at least one dependent variable.

5. The method of claim 4, further comprising:
representing said at least one of said physical quantities using a relation between said at least one dependent variable and another variable representing said at least one physical quantity.

6. The method of claim 5, wherein said at least one of said physical quantities is represented using at least one of: a numerical value and a mathematical expression.

7. The method of claim 6, further comprising:
forming said mathematical expression including at least one of: a space coordinate, a time coordinate, a numerical value, and an actual physical quantity.

8. The method of claim 1, further comprising:
associating at least one subdomain with each application mode.

9. The method of claim 8, wherein each of said physical quantities is described by at least one physical property, and the method further comprising:
disabling at least one physical quantity and associated variables in a subdomain.

10. The method of claim 1, further comprising:
displaying on said display device a partial differential equation in one of a: coefficient view and a general form corresponding to a representation of said partial differential equation; and
modifying a portion of said partial differential equation.

11. The method of claim 10, further comprising:
modifying at least one boundary condition of said partial differential equation.

12. The method of claim 10, further comprising:
modifying at least one coefficient of said partial differential equation.

13. The method of claim 10, further comprising:
obtaining data using a graphical user interface in connection with said one of said plurality of physical systems.

14. The method of claim 10, wherein said display device comprises a graphical user interface to display and input data.

15. The method of claim 1, further comprising:
solving said combined system of partial differential equations using a coefficient form of said combined set of partial differential equations.

16. The method of claim 1, further comprising:
solving said combined set of partial differential equations using a general form of said combined system of partial differential equations.

17. The method of claim 16, further comprising:
converting at least one set of partial differential equations included in said combined set of partial differential equations from coefficient to general form.

18. The method of claim 17, further comprising:
converting said combined set of partial differential equations from coefficient to general form.

19. The method of claim 18, further comprising:
using linearization of a general form to solve for a non-linear set of partial differential equations.

20. The method of claim 19, further comprising:
using a Newton method in solving for said non-linear set of partial differential equations.

21. The method of claim 1, further comprising:
solving said combined set of partial differential equations.

22. The method of claim 21, further comprising:
selecting a portion of physical quantities in said combined set of partial differential equations;
solving for one or more variables associated with said portion of physical quantities.

23. The method of claim 22, further comprising:
using values associated with physical quantities not included in said portion for specifying initial conditions.

24. The method of claim 21, further comprising:
selecting a solver type specifying a particular technique used in solving said combined set of partial differential equations.

25. The method of claim 24, wherein said solver type uses a finite element method.

26. The method of claim 1, further comprising:
using a graphical user interface in connection with input data;
storing said input data in a representation in a data structure stored in a memory of said first physical computing device or said second physical computing device; and
converting said input data into an intermediate form wherein said intermediate form for each set of partial differential equations associated with said one of said plurality of physical systems is used in forming said combined set.

27. The method of claim 1, further comprising:
determining a submode setting associated with one of the sets of partial differential equations associated with said one of said plurality of systems; and
determining a number of variables included in said one set of partial differential equations in accordance with said submode setting and a type of a corresponding application mode.

28. The method of claim 27, wherein said submode is one of stationary, time dependent, linear, non-linear, scalar and multi-component.

29. The method of claim 1, further comprising:
selecting at least one application mode.

30. The method of claim 29, wherein said at least one application mode is one of predefined and user defined.

31. The method of claim 30, further comprising:
modifying a set of routines associated with a predefined application mode to be used in connection with a user defined application mode.

32. The method of claim 1, wherein said one of said plurality of physical systems being modeled is a one-dimensional geometry model.

33. The method of claim 1, wherein said one of said plurality of physical systems being modeled is a two-dimensional geometry model.

34. The method of claim 1, wherein each of said plurality of physical systems being modeled has up to a three-dimensional geometry.

35. The method of claim 31, further comprising:
defining a user-defined application mode.

36. The method of claim 35, wherein said defining a user-defined application mode further comprises:
defining an object class corresponding to said user-defined application mode; and
defining a first portion of methods included in said object class using functionality that is inherited from other classes.

37. The method of claim 36, further comprising:
overloading a second portion of methods to provide alternative functionality.

38. The method of claim 37, further comprising:
using overloading in connection with at least one method to disable functionality of said at least one method.
39. The method of claim 31, further comprising:
defining an application that is a subclass of an existing class corresponding to functionality of an application mode.
40. The method of claim 39, wherein said application mode is user-defined.
41. The method of claim 39, wherein said application mode is predefined.
42. The method of claim 34, further comprising:
storing said output of said model of said combined physical system in a computer readable memory or in a computer readable storage system located within said first physical computing device or said second physical computing device.
43. The method of claim 1, further comprising:
storing said output of said model of said combined physical system in a data storage system, said data storage system communicatively connected to said communication device and to a plurality of host computers comprising at least one of said first physical computing device and said second physical computing device.
44. The method of claim 1, further comprising:
displaying said output of said model of said combined physical system on said display device, wherein said first physical computing device or said second physical computing device comprise said display device.
45. The method of claim 2, further comprising:
displaying said output of said model of said combined physical system on said display device, wherein said first physical computing device or said second physical computing device comprise said display device.
46. The method of claim 34, wherein said representation of at least one of said plurality of physical systems as two or more selected application modes modeling physical quantities includes a time dimension.
47. The method of claim 46, further comprising:
storing said output of said model of said combined physical system in a computer readable memory or in a computer readable storage system located within said first physical computing device or said second physical computing device.
48. The method of claim 46, further comprising:
storing said output of said model of said combined physical system in a data storage system, said data storage system communicatively connected to said communication device and to a plurality of host computers comprising at least one of said first physical computing device and said second physical computing device.
49. The method of claim 48, further comprising:
displaying said output of said model of said combined physical system on said display device, wherein said first physical computing device or said second physical computing device comprise said display device.
50. An apparatus for producing a model of a combined physical system having physical quantities by representing physical quantities of said combined physical system in terms of a combined set of partial differential equations, said apparatus comprising:
a computer comprising a processor, a user input device, a display device, and a memory device, said memory device containing executable instructions for producing said model of said combined physical system having physical quantities by representing physical quantities of said combined physical system in terms of said combined set of partial differential equations, said executable instructions causing said processor to perform, upon execution, acts comprising
representing in up to three space dimensions at least one of a plurality of systems as two or more selected application modes modeling physical quantities of said one of said plurality of systems;
using said processor, determining a set of partial differential equations for each of said two or more selected application modes, parameters of said partial differential equations being physical quantities of corresponding ones of said plurality of systems;
forming said combined set of partial differential equations using sets of partial differential equations associated with said one of said plurality of systems; and
outputting said model of said combined physical system to said display device or a communication device, said model based on said combined set of partial differential equations for said two or more selected application modes for said one of said plurality of systems, whereby said model represents a mathematical expression of said physical quantities of said combined physical system.
51. The apparatus of claim 50, further comprising:
representing at least one of said physical quantities of a first of said plurality of application modes using at least one dependent variable in said set of partial differential equations corresponding to said first of said application modes.
52. The apparatus of claim 51, further comprising:
representing said at least one of said physical quantities directly as said at least one dependent variable.
53. The apparatus of claim 52, further comprising:
representing said at least one of said physical quantities using a relation between said at least one dependent variable and another variable representing said at least one physical quantity.
54. The apparatus of claim 53, wherein said at least one of said physical quantities is represented using at least one of: a numerical value and a mathematical expression.
55. The apparatus of claim 54, further comprising:
forming said mathematical expression including at least one of: a time coordinate, a numerical value, and an actual physical quantity.
56. The apparatus of claim 50, further comprising:
associating at least one subdomain with each application mode.
57. The apparatus of claim 56, wherein each of said physical quantity is described by at least one physical property, and the apparatus further comprises:
disabling at least one physical quantity and associated variables for a portion of a subdomain.
58. The apparatus of claim 50, further comprising:
displaying a partial differential equation in one of a: coefficient view and a general form corresponding to a representation of said partial differential equation; and
modifying a portion of said partial differential equation.
59. The apparatus of claim 58, further comprising:
modifying at least one boundary condition of said partial differential equation.
60. The apparatus of claim 58, further comprising:
modifying at least one coefficient of said partial differential equation.
61. The apparatus of claim 58, further comprising:
obtaining data using a graphical user interface in connection with said one of said plurality of systems.

62. The apparatus of claim 58, wherein said user input device and said display device comprise a graphical user interface.

63. The apparatus of claim 50, further comprising:
solving said combined set of partial differential equations using a coefficient form of said combined set of partial differential equations.

64. The apparatus of claim 50, further comprising:
solving said combined set of partial differential equations using a general form of said combined set of partial differential equations.

65. The apparatus of claim 64, further comprising:
converting at least one set of partial differential equations included in said combined set of partial differential equations from coefficient to general form.

66. The apparatus of claim 65, further comprising:
converting said combined set of partial differential equations from coefficient to general form.

67. The apparatus of claim 66, further comprising:
using linearization of a general form to solve for a non-linear system of partial differential equations.

68. The apparatus of claim 67, further comprising:
using a Newton method in solving for said non-linear system of partial differential equations.

69. The apparatus of claim 50, further comprising:
solving said combined set of partial differential equations.

70. The apparatus of claim 69, wherein said solving said combined set further includes:
selecting a portion of physical quantities in said combined set of partial differential equations; and
solving for one or more variables associated with said portion of variables.

71. The apparatus of claim 70, further comprising:
using values associated with physical quantities not included in said portion for specifying initial conditions.

72. The apparatus of claim 69, further comprising:
selecting a solver type specifying a particular technique used in solving said combined set of partial differential equations.

73. The apparatus of claim 72, wherein said solver type includes solving a system of partial differential equations using a finite element method.

74. The apparatus of claim 50, further comprising:
receiving input data for said model using a graphical user interface;
storing said input data in a representation in a data structure stored in said memory device of said computer; and
converting said input data into an intermediate form wherein said intermediate form for each set of partial differential equations associated with said one of said plurality of systems is used in forming said combined set.

75. The apparatus of claim 50, further comprising:
determining a submode setting associated with one of the sets of partial differential equations associated with said one of said plurality of systems; and
determining a number of variables included in said one set of partial differential equations in accordance with said submode setting and a type of a corresponding application mode.

76. The apparatus of claim 75, wherein said submode is one of stationary, time dependent, linear, non-linear, scalar and multi-component.

77. The apparatus of claim 50, further comprising:
selecting at least one application mode.

78. The apparatus of claim 77, wherein said at least one application mode is one of predefined and user defined.

79. The apparatus of claim 78, further comprising:
defining a user defined application mode; and
modifying a set of routines associated with a predefined application mode to be used in connection with a user defined application mode.

80. The apparatus of claim 50, further comprising:
defining a user-defined application mode.

81. The apparatus of claim 80, further comprising:
defining an object class corresponding to said user-defined application mode; and
defining a first portion of methods included in said object class using functionality that is inherited from other classes.

82. The apparatus of claim 81, further comprising:
overloading a second portion of methods to provide alternative functionality.

83. The apparatus of claim 82, further comprising:
using overloading in connection with at least one method to disable functionality of said at least one method.

84. The apparatus of claim 50, further comprising:
defining an application that is a subclass of an existing class corresponding to functionality of an application mode.

85. The apparatus of claim 84, wherein said application mode is user-defined.

86. The apparatus of claim 84, wherein said application mode is predefined.

87. The apparatus of claim 50, wherein said plurality of systems comprise at least one of a structural system, a fluids system, and an electromagnetic system.

88. The apparatus of claim 50, wherein said representation of at least one of a plurality of systems as two or more selected application modes further includes a time dimension.

89. A method executed in a computer system with at least one processor for producing a model of a combined physical system having physical quantities by representing physical quantities of the combined physical system in terms of a combined set of partial differential equations, the method comprising:
defining a plurality of user-defined application modes modeling physical quantities of an associated model having up to three space dimensions, wherein the application modes are configured to model the physical quantities of at least one of a structural system, a fluids system, and an electromagnetic system;
selecting two or more of the user-defined application modes;
using the processor, determining sets of partial differential equations for the selected two or more user-defined application modes of the associated model, parameters of the partial differential equations being physical quantities of the associated model; and
outputting, to a memory device or a communication device, the model based on a combination of the determined sets of partial differential equations for the two or more selected user-defined application modes for the associated model, whereby the model represents physical quantities of the combined physical system.

90. The method of claim 89, further comprising:
solving for said set of partial differential equation using a finite element method.

91. The method of claim 89, wherein said defining a user-defined application mode further comprises:
defining an object class corresponding to said user-defined application mode; and
defining a first portion of methods included in said object class using functionality that is inherited from other classes.

92. The method of claim 91, further comprising:
overloading a second portion of methods to provide alternative functionality.

93. The method of claim 92, further comprising:
using overloading in connection with at least one method to disable functionality of said at least one method.

94. The method of claim 89, further comprising:
defining at least one user-defined application that is a subclass of an existing class associated with an application mode.

95. The method of claim 94, wherein said application mode associated with said existing class is user-defined.

96. The method of claim 94, wherein said application mode associated with said existing class is predefined.

97. The method of claim 89, wherein said associated model further includes a time dimension.

98. An apparatus for producing a model of a combined physical system having physical quantities by representing physical quantities of said combined physical system in terms of solving a system of partial differential equations, said apparatus comprising:
a computer system comprising a processor, a user input device, a display device, and a memory device, said memory device containing executable instructions for producing said model of said combined physical system having physical quantities by representing physical quantities of said combined physical system in terms of solving a system of partial differential equations, said executable instructions causing said processor to perform, upon execution, acts comprising
defining a plurality of user-defined application modes modeling physical quantities of an associated model;
selecting two or more of said user-defined application modes;
using said processor or another processor, determining sets of partial differential equations for said selected two or more user-defined application modes of said associated model, parameters of said partial differential equations being physical quantities of corresponding systems; and
outputting to at least one of said display device, another memory device, and a communication device said model based on a combination of said determined sets of partial differential equations for said two or more selected user-defined application modes for said associated model, whereby said model represents a mathematical expression of said physical quantities of said combined physical system.

99. The apparatus of claim 98, further comprising:
solving for said set of partial differential equations using a finite element method.

100. The apparatus of claim 98, wherein said defining a user-defined application mode further comprises:
defining an object class corresponding to said user-defined application mode; and
defining a first portion of methods included in said object class using functionality that is inherited from other classes.

101. The apparatus of claim 100, further comprising:
overloading a second portion of methods to provide alternative functionality.

102. The apparatus of claim 101, further comprising:
using overloading in connection with at least one method to disable functionality of said at least one method.

103. The apparatus of claim 102, further comprising:
selecting a plurality of application modes associated with at least one of a plurality of systems, said user-defined application being one of said plurality of application modes selected; and
forming a combined set of partial differential equations using sets of partial differential equations associated with said plurality of application modes.

104. The apparatus of claim 98, further comprising:
defining at least one user-defined application that is a subclass of an existing class associated with an application mode.

105. The apparatus of claim 104, wherein said application mode associated with said existing class is user-defined.

106. The apparatus of claim 104, wherein said application mode associated with said existing class is predefined.

107. The apparatus of claim 98, wherein said associated model has up to three space dimensions.

108. The apparatus of claim 98, wherein said physical systems comprise at least one of a structural system, a fluids system, and an electromagnetic system.

109. A method executed in a computer system with at least one physical computing device for producing a model of a combined physical system having physical quantities by representing physical quantities of said combined physical system in terms of a combined set of partial differential equations, said method comprising:
representing in up to three space dimensions at least one of a plurality of systems as two or more selected application modes modeling physical quantities of said at least one of said plurality of systems, wherein said systems include a structural system, a fluids system, an electromagnetic system, or any combination thereof;
using a first physical computing device to determine a set of partial differential equations for each of said two or more selected application modes, parameters of said partial differential equations being physical quantities of corresponding ones of said plurality of systems;
using said first physical computing device or a second physical computing device to form said combined set of partial differential equations using the determined sets of partial differential equations associated with said one of said plurality of systems; and
outputting to a display device, a storage device, or a communication device said model of said combined physical system based on said combined set of partial differential equations for the two or more selected application modes for said one of said plurality of systems, whereby said model represents a mathematical expression of said physical quantities of said combined physical system.

110. A method executed in a computer system with at least one physical computing device for producing a model of a combined physical system having physical quantities by representing physical quantities of said combined physical system in terms of a combined set of partial differential equations, said method comprising:
representing at least one of a plurality of systems as two or more selected application modes modeling physical quantities of said at least one of said plurality of systems, wherein said systems comprise at least one of a structural system, a fluids system, and an electromagnetic system;
using a first physical computing device to determine a set of partial differential equations for each of said two or more selected application modes, parameters of said partial differential equations being physical quantities of corresponding ones of said plurality of systems;

using said first physical computing device or a second physical computing device to form said combined set of partial differential equations using the determined sets of partial differential equations associated with said one of said plurality of systems; and outputting to a display device, a storage device, or a communication device said model of said combined physical system based on said combined set of partial differential equations for the two or more selected application modes for said one of said plurality of systems, whereby said model represents a mathematical expression of said physical quantities of said combined physical system.

111. A method executed in a computer system with at least one physical computing device for producing a model of a combined physical system having physical quantities and a solution to said model, said method comprising:

representing said combined physical system by a geometry described by a mesh and a set of physical properties, said mesh including a plurality of elements, each of said elements being characterized by a shape;

providing a plurality of application modes;

selecting at least a first and a second of said application modes;

using a first physical computing device to generate a first plurality of partial differential equations based on said first application mode and a second plurality of partial differential equations based on said second application mode, each of the partial differential equations representing a behavior of at least one of said physical quantities of said model in response to said set of physical properties;

using said first physical computing device or a second physical computing device and the first and second pluralities of partial differential equations to form a combined system of partial differential equations;

generating a solution using said combined system of partial differential equations, said solution comprising numerical values for said physical quantities of node points in said mesh;

and storing in a computer readable memory or in a computer readable data storage system said solution to said model.

112. A method of claim 111, further comprising:

producing a physical component corresponding to said mesh and said set of physical properties.

113. A method of claim 111, further comprising:

displaying said output of said model of said combined structural system on said display device, wherein said first physical computing device or said second physical computing device comprise said display device, wherein said computer readable memory or said computer readable storage system is located within said first physical computing device or said second physical computing device.

114. An apparatus for producing a model of a combined fluids system having physical quantities by representing said physical quantities of said combined fluids system by partial differential equations, said apparatus comprising:

a computer system comprising at least one processor, a user input device, a display device, and a memory device, said memory device containing executable instructions for producing a model of the combined fluids system by representing the physical quantities of the combined fluids system in terms of partial differential equations, the executable instructions causing the processor to perform, upon execution, acts comprising representing the combined fluids system by a geometry described by a mesh and a set of physical properties, the mesh including a plurality of elements, each of the elements being characterized by a shape;

providing a plurality of application modes;

selecting at least a first and a second of the application modes;

generating a first plurality of partial differential equations based on the first application mode and a second plurality of partial differential equations based on the second application mode, each of the partial differential equations representing a behavior of at least one of the physical quantities of the model in response to the set of physical properties;

forming a combined system of partial differential equations based on the first and second pluralities of partial differential equations;

generating a solution based on the combined system of partial differential equations, the solution comprising numerical values for the physical quantities of node points in the mesh;

and storing in a computer readable memory or in a computer readable data storage system the solution to the model.

115. An apparatus for producing a model of a combined system having physical quantities by representing said physical quantities of said combined system by partial differential equations, said apparatus comprising:

a physical computing system comprising a first processor and a second processor, a user input device, a display device, and a memory device, said memory device containing executable instructions for producing a model of the combined system by representing the physical quantities of the combined system in terms of partial differential equations, the executable instructions causing the first processor or another processor to perform, upon execution, acts comprising representing the combined system by a geometry described by a mesh and a set of physical properties, the mesh including a plurality of elements, each of the elements being characterized by a shape;

providing a plurality of application modes;

selecting at least a first and a second of the application modes;

using the first processor or the second processor to generate a first plurality of partial differential equations based on the first application mode and a second plurality of partial differential equations based on the second application mode, each of the partial differential equations representing a behavior of at least one of the physical quantities of the model in response to the set of physical properties;

forming a combined system of partial differential equations based on the first and second pluralities of partial differential equations;

generating a solution based on the combined system of partial differential equations, the solution comprising numerical values for the physical quantities of node points in the mesh;

and storing in a computer readable memory or in a computer readable data storage system the solution to the model.

* * * * *

UNITED STATES PATENT AND TRADEMARK OFFICE
CERTIFICATE OF CORRECTION

PATENT NO. : 7,623,991 B1  
APPLICATION NO. : 09/675778  
DATED : November 24, 2009  
INVENTOR(S) : Langemyr et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1088 days.

Signed and Sealed this

Twenty-sixth Day of October, 2010

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,623,991 C1 | Page 1 of 1 |
| APPLICATION NO. | : 90/009817 | |
| DATED | : February 21, 2012 | |
| INVENTOR(S) | : Langemyr et al. | |

It is certified that error appears in the above-identified patent and that said Letters Patent is hereby corrected as shown below:

In column 1, line 53 (Claim 116, line 9), replace the word "quantites" with the word -- quantities --.

In column 2, line 64 (Claim 126, line 6), replace the word "parital" with the word -- partial --.

In column 3, line 27 (Claim 135, line 2), after the word "solve" insert the word -- for --.

In column 4, line 18 (Claim 149, line 2), after the word "being" delete the word "a".

In column 4, line 27 (Claim 152, line 3), after the word "object" insert the word -- class --.

In column 8, line 14 (Claim 203, line 2), replace the word "in" with the word -- is --.

In column 9, line 29 (Claim 216, line 10), after the word "having" delete the word "a".

In column 10, line 38 (Claim 228, line 2), replace the word "producting" with the word -- producing --.

In column 11, line 24 (Claim 230, line 13), replace the word "a" with the word -- at --.

In column 11, line 52 (Claim 232, line 1), after the word "with" replace the word "a" with the word -- at --.

In column 13, line 17 (Claim 237, line 5), replace the word "a" with the word -- at --.

Signed and Sealed this
Eighth Day of May, 2012

David J. Kappos
*Director of the United States Patent and Trademark Office*

US007623991C1

(12) EX PARTE REEXAMINATION CERTIFICATE (8866th)

United States Patent
Langemyr et al.

(10) Number: US 7,623,991 C1
(45) Certificate Issued: *Feb. 21, 2012

(54) METHOD AND APPARATUS FOR THE SPECIFICATION AND AUTOMATIC DERIVATION OF PARTIAL DIFFERENTIAL EQUATIONS ASSOCIATED WITH COUPLED PHYSICAL QUANTITIES IN A MULTIPHYSICS PROBLEM

(75) Inventors: Lars Langemyr, Stockholm (SE);
Magnus Marklund, Stockholm (SE);
Arne Nordmark, Stockholm (SE);
Per-Olof Persson, Stockholm (SE);
Magnus Ringh, Burlington, MA (US)

(73) Assignee: Comsol AB, Stockholm (SE)

Reexamination Request:
No. 90/009,817, Aug. 31, 2010

Reexamination Certificate for:
Patent No.: 7,623,991
Issued: Nov. 24, 2009
Appl. No.: 09/675,778
Filed: Sep. 29, 2000

(*) Notice: This patent is subject to a terminal disclaimer.

Certificate of Correction issued Oct. 26, 2010.

Related U.S. Application Data
(60) Provisional application No. 60/222,394, filed on Aug. 2, 2000.

(51) Int. Cl.
*G06F 7/60* (2006.01)
*G06F 17/10* (2006.01)

(52) U.S. Cl. ............................................. 703/2
(58) Field of Classification Search ........................ None
See application file for complete search history.

(56) References Cited

To view the complete listing of prior art documents cited during the proceeding for Reexamination Control Number 90/009,817, please refer to the USPTO's public Patent Application Information Retrieval (PAIR) system under the Display References tab.

*Primary Examiner* — Matthew Heneghan

(57) ABSTRACT

Disclosed is a system for representing and modeling one or more systems in which each system corresponds to an application mode. For each application mode, physical quantities are modeled and may be defined using a graphical user interface. Physical properties may be used to model the physical quantities of each system. The physical properties may be defined in terms of numerical values or constants, and mathematical expressions that may include numerical values, space coordinates, time coordinates, and actual physical quantities. Physical quantities and any associated variables may apply to some or all of a geometric domain, and may also be disabled in other parts of a geometrical domain. Partial differential equations describe the physical quantities. One or more application modes may be combined using an automated technique into a combined system of partial differential equations as a multiphysics model. A portion of the physical quantities and variables associated with the combined system may be selectively solved for. The partial differential equations may be displayed and may in turn solve for the system of partial differential equations in accordance with a general form or a coefficient form. An automated technique provides for automatic derivation of the combined partial differential equations and boundary conditions. This technique automatically merges the equations from a plurality of application modes, and in some instances, performs symbolic differentiation of the equations, producing a single system of partial differential equations. A subset of physical quantities and associated variables not solved for may be used as initial values to the system of partial differential equations.

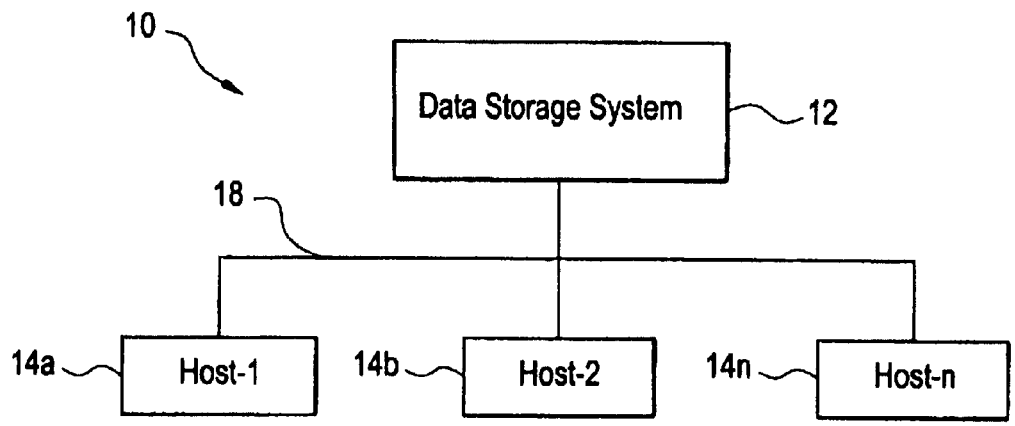

US 7,623,991 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-21, 24-112, 114 and 115 is confirmed.

Claims 22 and 113 are determined to be patentable as amended.

Claim 23, dependent on an amended claim, is determined to be patentable.

New claims 116-239 are added and determined to be patentable.

22. The method of claim 21, further comprising:
selecting a portion of physical quantities in said combined set of partial differential equations; *and*
solving for one or more variables associated with said portion of physical quantites.

113. A method of claim 111, further comprising:
displaying said output of said model of said combined [structural] *physical* system on said display device, wherein said first physical computing device or said second physical computing device comprise said display device,
wherein said computer readable memory or said computer readable storage system is located within said first physical computing device or said second physical computing device.

*116. A method executed in a computer system with at least one physical computing device for producing a model of a combined physical system having physical quantities by representing physical quantities of said combined physical system in terms of a combined set of partial differential equations, said method comprising:*
*representing at least one of a plurality of physical systems as two or more selected application modes modeling physical quantites of said at least one of said plurality of physical systems, wherein said application modes are configured to model said physical quantities for at least one of structural mechanics properties, fluid dynamic properties, electromagnetic properties, chemical reaction properties, acoustic properties, and heat transfer properties of said physical system;*
*receiving an input of one or more physical properties for at least one of said selected application modes, wherein at least one of said one or more physical properties is specified in terms of at least one of said physical quantities;*
*using a first physical computing device, determining a set of partial differential equations for each of said two or more selected application modes, parameters of said partial differential equations being physical quantities of corresponding ones of said plurality of physical systems;*
*using said first physical computing device or a second physical computing device, forming said combined set of partial differential equations using said determined sets of partial differential equations associated with said one of said plurality of physical systems; and*
*outputting to a display device or a communication device said model of said combined physical system based on said combined set of partial differential equations for said two or more selected application modes for said one of said plurality of physical systems, whereby said model represents a mathematical expression of said physical quantities of said combined physical system.*

*117. The method of claim 116, wherein at least one of said one or more physical properties is defined as a mathematical expression in terms of said physical quantities, and at least one of said physical quantities is expressed in terms of a dependent variable associated with at least one of said application modes.*

*118. The method of claim 116, further comprising:*
*storing said output of said model of said combined physical system in a computer readable memory or in a computer readable storage system located within said first physical computing device or said second physical computing device.*

*119. The method of claim 116, further comprising:*
*representing at least one of said physical quantities of at least one of said selected application modes using at least one dependent variable in said set of partial differential equations corresponding to said at least one of said selected application modes.*

*120. The method of claim 119, further comprising:*
*representing said at least one of said physical quantities directly as said at least one dependent variable.*

*121. The method of claim 120, further comprising:*
*representing said at least one of said physical quantities using a relation between said at least one dependent variable and another variable representing said at least one physical quantity.*

*122. The method of claim 121, wherein said at least one of said physical quantities is represented using at least one of: a numerical value and a mathematical expression.*

*123. The method of claim 122, further comprising:*
*forming said mathematical expression including at least one of: a space coordinate, a time coordinate, a numerical value, and an actual physical quantity.*

*124. The method of claim 116, further comprising:*
*associating at least one subdomain with each application mode.*

*125. The method of claim 124, wherein each of said physical quantities is described by at least one physical property, and the method further comprising:*
*disabling at least one physical quantity and associated variables in a subdomain.*

*126. The method of claim 116, further comprising:*
*displaying on said display device a partial differential equation in one of a: coefficient view and a general form corresponding to a representation of said partial differential equation; and*
*modifying a portion of said parital differential equation.*

*127. The method of claim 126, further comprising:*
*modifying at least one boundary condition of said partial differential equation.*

128. The method of claim 126, further comprising:
modifying at least one coefficient of said partial differential equation.
129. The method of claim 126, further comprising:
obtaining data using a graphical user interface in connection with said one of said plurality of physical systems.
130. The method of claim 126, wherein said display device comprises a graphical user interface to display and input data.
131. The method of claim 116, further comprising:
solving said combined system of partial differential equations using a coefficient form of said combined set of partial differential equations.
132. The method of claim 116, further comprising:
solving said combined set of partial differential equations using a general form of said combined system of partial differential equations.
133. The method of claim 132, further comprising:
converting at least one set of partial differential equations included in said combined set of partial differential equations from coefficient to general form.
134. The method of claim 133, further comprising:
converting said combined set of partial differential equations from coefficient to general form.
135. The method of claim 134, further comprising:
using linearization of a general form to solve a non-linear set of partial differential equations.
136. The method of claim 135, further comprising:
using a Newton method in solving for said non-linear set of partial differential equations.
137. The method of claim 116, further comprising:
solving said combined set of partial differential equations.
138. The method of claim 137, further comprising:
selecting a portion of physical quantities in said combined set of partial differential equations; and
solving for one or more variables associated with said portion of physical quantities.
139. The method of claim 138, further comprising:
using values associated with physical quantities not included in said portion for specifying initial conditions.
140. The method of claim 137, further comprising:
selecting a solver type specifying a particular technique used in solving said combined set of partial differential equations.
141. The method of claim 140, wherein said solver type uses a finite element method.
142. The method of claim 116, further comprising:
using a graphical user interface in connection with input data;
storing said input data in a representation in a data structure stored in a memory of said first physical computing device or said second physical computing device; and
converting said input data into an intermediate form wherein said intermediate form for each set of partial differential equations associated with said one of said plurality of physical systems is used in forming said combined set.
143. The method of claim 116, further comprising:
determining a submode setting associated with one of the sets of partial differential equations associated with said one of said plurality of systems; and
determining a number of variables included in said one set of partial differential equations in accordance with said submode setting and a type of a corresponding application mode.
144. The method of claim 143, wherein said submode is one of stationary, time dependent, linear, non-linear, scalar and multi-component.
145. The method of claim 116, further comprising:
selecting at least one application mode.
146. The method of claim 145, wherein said at least one application mode is one of predefined and user defined.
147. The method of claim 146, further comprising:
modifying a set of routines associated with a predefined application mode to be used in connection with a user defined application mode.
148. The method of claim 116, wherein said one of said plurality of physical systems being modeled is a one-dimensional geometry model.
149. The method of claim 116, wherein said one of said plurality of physical systems being a modeled is a two-dimensional geometry model.
150. The method of claim 116, wherein each of said plurality of physical systems being modeled has up to a three-dimensional geometry.
151. The method of claim 147, further comprising:
defining a user-defined application mode.
152. The method of claim 151, wherein said defining a user-defined application mode further comprises:
defining an object corresponding to said user-defined application mode; and
defining a first portion of methods included in said object class using functionality that is inherited from other classes.
153. The method of claim 152, further comprising:
overloading a second portion of methods to provide alternative functionality.
154. The method of claim 153, further comprising:
using overloading in connection with at least one method to disable functionality of said at least one method.
155. The method of claim 147, further comprising:
defining an application that is a subclass of an existing class corresponding to functionality of an application mode.
156. The method of claim 155, wherein said application mode is user-defined.
157. The method of claim 155, wherein said application mode is predefined.
158. The method of claim 150, further comprising:
storing said output of said model of said combined physical system in a computer readable memory or in a computer readable storage system located within said first physical computing device or said second physical computing device.
159. The method of claim 116, further comprising:
storing said output of said model of said combined physical system in a data storage system, said data storage system communicatively connected to said communication device and to a plurality of host computers comprising at least one of said first physical computing device and said second physical computing device.
160. The method of claim 116, further comprising:
displaying said output of said model of said combined physical system on said display device, wherein said first physical computing device or said second physical computing device comprise said display device.
161. The method of claim 118, further comprising:
displaying said output of said model of said combined physical system on said display device, wherein said first physical computing device or said second physical computing device comprise said display device.

162. The method of claim 150, wherein said representation of at least one of said plurality of physical systems as two or more selected application modes modeling physical quantities includes a time dimension.

163. The method of claim 162, further comprising:
storing said output of said model of said combined physical system in a computer readable memory or in a computer readable storage system located within said first physical computing device or said second physical computing device.

164. The method of claim 162, further comprising:
storing said output of said model of said combined physical system in a data storage system, said data storage system communicatively connected to said communication device and to a plurality of host computers comprising at least one of said first physical computing device and said second physical computing device.

165. The method of claim 164, further comprising:
displaying said output of said model of said combined physical system on said display device, wherein said first physical computing device or said second physical computing device comprise said display device.

166. An apparatus for producing a model of a combined physical system having physical quantities by representing physical quantities of said combined physical system in terms of a combined set of partial differential equations, said apparatus comprising:
a computer comprising a processor, a user input device, a display device, and a memory device, said memory device containing executable instructions for producing said model of said combined physical system having physical quantities by representing physical quantities of said combined physical system in terms of said combined set of partial differential equations, said executable instructions causing said processor to perform, upon execution, acts comprising
representing in up to three space dimensions at least one of a plurality of systems as two or more selected application modes modeling physical quantities of said one of said plurality of systems;
receiving an input of one or more physical properties for at least one of the selected application modes, wherein at least one of the one or more physical properties is specified in terms of at least one of the physical quantities;
using said processor, determining a set of partial differential equations for each of said two or more selected application modes, parameters of said partial differential equations being physical quantities of corresponding ones of said plurality of systems;
forming said combined set of partial differential equations using sets of partial differential equations associated with said one of said plurality of systems; and
outputting said model of said combined physical system to said display device or a communication device, said model based on said combined set of partial differential equations for said two or more selected application modes for said one of said plurality of systems, whereby said model represents a mathematical expression of said physical quantities of said combined physical system.

167. The method of claim 166, wherein at least one of said one or more physical properties is defined as a mathematical expression in terms of said physical quantities, and at least one of said physical quantities is expressed in terms of a dependent variable associated with at least one of said application modes.

168. The apparatus of claim 166, further comprising:
representing at least one of said physical quantities of a first of said plurality of application modes using at least one dependent variable in said set of partial differential equations corresponding to said first of said application modes.

169. The apparatus of claim 168, further comprising:
representing said at least one of said physical quantities directly as said at least one dependent variable.

170. The apparatus of claim 168, further comprising:
representing said at least one of said physical quantities using a relation between said at least one dependent variable and another variable representing said at least one physical quantity.

171. The apparatus of claim 170, wherein said at least one of said physical quantities is represented using at least one of: a numerical value and a mathematical expression.

172. The apparatus of claim 171, further comprising:
forming said mathematical expression including at least one of a time coordinate, a numerical value, and an actual physical quantity.

173. The apparatus of claim 166, further comprising:
associating at least one subdomain with each application mode.

174. The apparatus of claim 173, wherein each of said physical quantities is described by at least one physical property, and the apparatus further comprises:
disabling at least one physical quantity and associated variables for a portion of a subdomain.

175. The apparatus of claim 166, further comprising:
displaying a partial differential equation in one of a coefficient view and a general form corresponding to a representation of said partial differential equation; and modifying a portion of said partial differential equation.

176. The apparatus of claim 175, further comprising:
modifying at least one boundary condition of said partial differential equation.

177. The apparatus of claim 175, further comprising:
modifying at least one coefficient of said partial differential equation.

178. The apparatus of claim 175, further comprising:
obtaining data using a graphical user interface in connection with one of said plurality of systems.

179. The apparatus of claim 175, wherein said user input device and said display device comprise a graphical user interface.

180. The apparatus of claim 166, further comprising:
solving said combined set of partial differential equations using a coefficient form of said combined set of partial differential equations.

181. The apparatus of claim 166, further comprising:
solving said combined set of partial differential equations using a general form of said combined set of partial differential equations.

182. The apparatus of claim 181, further comprising:
converting at least one set of partial differential equations included in said combined set of partial differential equations from coefficient to general form.

183. The apparatus of claim 182, further comprising:
converting said combined set of partial differential equations from coefficient to general form.

184. The apparatus of claim 183, further comprising:
using linearization of a general form to solve for a nonlinear system of partial differential equations.

185. The apparatus of claim 184, further comprising:
using a Newton method in solving for said non-linear system of partial differential equations.

186. The apparatus of claim 166, further comprising:
solving said combined set of partial differential equations.

187. The apparatus of claim 186, wherein said solving said combined set further includes:
selecting a portion of physical quantities in said combined set of partial differential equations; and
solving for one or more variables associated with said portion of variables.

188. The apparatus of claim 187, further comprising:
using values associated with physical quantities not included in said portion for specifying initial conditions.

189. The apparatus of claim 186, further comprising:
selecting a solver type specifying a particular technique used in solving said combined set of partial differential equations.

190. The apparatus of claim 189, wherein said solver type includes solving a system of partial differential equations using a finite element method.

191. The apparatus of claim 166, further comprising:
receiving input data for said model using a graphical user interface;
storing said input data in a representation in a data structure stored in said memory device of said computer; and
converting said input data into an intermediate form wherein said intermediate form for each set of partial differential equations associated with one of said plurality of systems is used in forming said combined set.

192. The apparatus of claim 166, further comprising:
determining a submode setting associated with one of the sets of partial differential equations associated with said one of said plurality of systems; and
determining a number of variables included in said one set of partial differential equations in accordance with said submode setting and a type of a corresponding application mode.

193. The apparatus of claim 192, wherein said submode is one of stationary, time dependent, linear, non-linear, scalar and multi-component.

194. The apparatus of claim 166, further comprising:
selecting at least one application mode.

195. The apparatus of claim 194, wherein said at least one application mode is one of predefined and user defined.

196. The apparatus of claim 195, further comprising:
defining a user defined application mode; and
modifying a set of routines associated with a predefined application mode to be used in connection with a user defined application mode.

197. The apparatus of claim 166, further comprising:
defining a user-defined application mode.

198. The apparatus of claim 197, further comprising:
defining an object class corresponding to said user-defined application mode; and
defining a first portion of methods included in said object class using functionality that is inherited from other classes.

199. The apparatus of claim 198, further comprising:
overloading a second portion of methods to provide alternative functionality.

200. The apparatus of claim 199, further comprising:
using overloading in connection with at least one method to disable functionality of said at least one method.

201. The apparatus of claim 166, further comprising:
defining an application that is a subclass of an existing class corresponding to functionality of an application mode.

202. The apparatus of claim 201, wherein said application mode is user-defined.

203. The apparatus of claim 201, wherein said application mode in predefined.

204. The apparatus of claim 166, wherein said plurality of systems comprise at least one of a structural system, a fluids system, and an electromagnetic system.

205. The apparatus of claim 166, wherein said representation of at least one of a plurality of systems as two or more selected application modes further includes a time dimension.

206. A method executed in a computer system with at least one processor for producing a model of a combined physical system having physical quantities by representing physical quantities of said combined physical system in terms of a combined set of partial differential equations, the method comprising:
defining a plurality of user-defined application modes modeling physical quantities of an associated model having up to three space dimensions, wherein said application modes are configured to model said physical quantities of at least one of a structural system, a fluids system, and an electromagnetic system;
selecting two or more of said user-defined application modes;
receiving an input of one or more physical properties for at least one of said selected application modes, wherein at least one of said one or more physical properties is specified in terms of at least one of said physical quantities;
using said processor, determining sets of partial differential equations for said selected two or more user-defined application modes of said associated model, parameters of said partial differential equations being physical quantities of said associated model; and
outputting, to a memory device or a communication device, said model based on a combination of said determined sets of partial differential equations for said two or more selected user-defined application modes for said associated model, whereby said model represents physical quantities of said combined physical system.

207. The method of claim 206, wherein at least one of said one or more physical properties is defined as a mathematical expression in terms of said physical quantities, and at least one of said physical quantities is expressed in terms of a dependent variable associated with at least one of said application modes.

208. The method of claim 206, further comprising:
solving for said set of partial differential equation using a finite element method.

209. The method of claim 206, wherein said defining a user-defined application mode further comprises:
defining an object class corresponding to said user-defined application mode; and

9 defining a first portion of methods included in said object class using functionality that is inherited from other classes.

210. The method of claim 209, further comprising:
overloading a second portion of methods to provide alternative functionality.

211. The method of claim 210, further comprising:
using overloading in connection with at least one method to disable functionality of said at least one method.

212. The method of claim 206, further comprising:
defining at least one user-defined application that is a subclass of an existing class associated with an application mode.

213. The method of claim 212, wherein said application mode associated with said existing class is user-defined.

214. The method of claim 212, wherein said application mode associated with said existing class is predefined.

215. The method of claim 206, wherein said associated model further includes a time dimension.

216. An apparatus for producing a model of a combined physical system having physical quantities by representing physical quantities of said combined physical system in terms of solving a system of partial differential equations, said apparatus comprising:

a computer system comprising a processor, a user input device, a display device, and a memory device, said memory device containing executable instructions for producing said model of said combined physical system having a physical quantities by representing physical quantities of said combined physical system in terms of solving a system of partial differential equations, said executable instructions causing said processor to perform, upon execution, acts comprising defining a plurality of user-defined application modes modeling physical quantities of an associated model;

selecting two or more of said user-defined application modes;

receiving an input of one or more physical properties for at least one of the selected application modes, wherein at least one of the one or more physical properties is specified in terms of at least one of the physical quantities;

using said processor or another processor, determining sets of partial differential equations for said selected two or more user-defined application modes of said associated model, parameters of said partial differential equations being physical quantities of corresponding systems; and outputting to at least one of said display device, another memory device, and a communication device said model based on a combination of said determined sets of partial differential equations for said two or more selected user-defined application modes for said associated model, whereby said model represents a mathematical expression of said physical quantities of said combined physical system.

217. The method of claim 216, wherein at least one of said one or more physical properties is defined as a mathematical expression in terms of said physical quantities, and at least one of said physical quantities is expressed in terms of a dependent variable associated with at least one of said application modes.

218. The apparatus of claim 216, further comprising:
solving for said set of partial differential equations using a finite element method.

10

219. The apparatus of claim 216, wherein said defining of said plurality of user defined application modes further comprises:

defining an object class corresponding to said user-defined application mode; and defining a first portion of methods included in said object class using functionality that is inherited from other classes.

220. The apparatus of claim 219, further comprising:
overloading a second portion of methods to provide alternative functionality.

221. The apparatus of claim 220, further comprising:
using overloading in connection with at least one method to disable functionality of said at least one method.

222. The apparatus of claim 221, further comprising:
selecting a plurality of application modes associated with at least one of a plurality of systems, said user-defined application being one of said plurality of application modes selected; and forming a combined set of partial differential equations using sets of partial differential equations associated with said plurality of application modes.

223. The apparatus of claim 216, further comprising:
defining at least one user-defined application that is a subclass of an existing class associated with an application mode.

224. The apparatus of claim 223, wherein said application mode associated with said existing class is user-defined.

225. The apparatus of claim 223, wherein said application mode associated with said existing class is predefined.

226. The apparatus of claim 216, wherein said associated model has up to three space dimensions.

227. The apparatus of claim 216, wherein said combined physical system comprises at least one of a structural system, a fluids system, and an electromagnetic system.

228. A method executed in a computer system with at least one physical computing device for producing a model of a combined physical system having physical quantities by representing physical quantities of said combined physical system in terms of a combined set of partial differential equations, said method comprising:

representing in up to three space dimensions at least one of a plurality of systems as two or more selected application modes modeling physical quantities of said at least one of said plurality of systems, wherein said systems include a structural system, a fluids system, an electromagnetic system, or any combination thereof;

receiving an input of one or more physical properties for at least one of the selected application modes, wherein at least one of the one or more physical properties is specified in terms of at least one of the physical quantities;

using a first physical computing device to determine a set of partial differential equations for each of said two or more selected application modes, parameters of said partial differential equations being physical quantities of corresponding ones of said plurality of systems;

using said first physical computing device or a second physical computing device to form said combined set of partial differential equations using the determined sets of partial differential equations associated with said one of said plurality of systems; and outputting to a display device, a storage device, or a communication device said model of said combined physical system based on said combined set of partial differential equations for the two or more selected application modes for said one of said plurality of systems, whereby said model represents a mathematical expression of said physical quantities of said combined physical system.

229. The method of claim 228, wherein at least one of said one or more physical properties is defined as a mathematical expression in terms of said physical quantities, and at least one of said physical quantities is expressed in terms of a dependent variable associated with at least one of said application modes.

230. A method executed in a computer system with at least one physical computing device for producing a model of a combined physical system having physical quantities by representing physical quantities of said combined physical system in terms of a combined set of partial differential equations, said method comprising:

representing at least one of a plurality of systems as two or more selected application modes modeling physical quantities of said at least one of said plurality of systems, wherein said systems comprise at least one of a structural system, a fluids system, and an electromagnetic system;

receiving an input of one or more physical properties for a least one of the selected application modes, wherein at least one of the one or more physical properties is specified in terms of at least one of the physical quantities;

using a first physical computing device to determine a set of partial differential equations for each of said two or more selected application modes, parameters of said partial differential equations being physical quantities of corresponding ones of said plurality of systems;

using said first physical computing device or a second physical computing device to form said combined set of partial differential equations using the determined sets of partial differential equations associated with said one of said plurality of systems; and outputting to a display device, a storage device, or a communication device said model of said combined physical system based on said combined set of partial differential equations for the two or more selected application modes for said one of said plurality of systems, whereby said model represents a mathematical expression of said physical quantities of said combined physical system.

231. The method of claim 230, wherein at least one of said one or more physical properties is defined as a mathematical expression in terms of said physical quantities, and at least one of said physical quantities is expressed in terms of a dependent variable associated with at least one of said application modes.

232. A method executed in a computer system with a least one physical computing device for producing a model of a combined physical system having physical quantities and a solution to said model, said method comprising:

representing said combined physical system by a geometry described by a mesh and a set of physical properties, said mesh including a plurality of elements, each of said elements being characterized by a shape;

providing a plurality of application modes;

selecting at least a first and a second of said application modes;

receiving an input of one or more physical properties for at least one of the selected application modes, wherein at least one of the one or more physical properties is specified in terms of at least one of the physical quantities;

using a first physical computing device to generate a first plurality of partial differential equations based on said first application mode and a second plurality of partial differential equations based on said second application mode, each of the partial differential equations representing a behavior of at least one of said physical quantities of said model in response to said set of physical properties;

using said first physical computing device or a second physical computing device and the first and second pluralities of partial differential equations to form a combined system of partial differential equations;

generating a solution using said combined system of partial differential equations, said solution comprising numerical values for said physical quantities of node points in said mesh; and storing in a computer readable memory or in a computer readable data storage system said solution to said model.

233. The method of claim 232, wherein at least one of said one or more physical properties is defined as a mathematical expression in terms of said physical quantities, and at least one of said physical quantities is expressed in terms of a dependent variable associated with at least one of said application modes.

234. The method of claim 232, further comprising:

producing a physical component corresponding to said mesh and said set of physical properties.

235. The method of claim 232, further comprising:

displaying said output of said model of said combined physical system on said display device, wherein said first physical computing device or said second physical computing device comprise said display device, wherein said computer readable memory or said computer readable storage system is located within said first physical computing device or said second physical computing device.

236. An apparatus for producing a model of a combined fluids system having physical quantities by representing said physical quantities of said combined fluids system by partial differential equations, said apparatus comprising:

a computer system comprising at least one processor, a user input device, a display device, and a memory device, said memory device containing executable instructions for producing a model of the combined fluids system by representing the physical quantities of the combined fluids system in terms of partial differential equations, the executable instructions causing the processor to perform, upon execution, acts comprising representing the combined fluids system by a geometry described by a mesh and a set of physical properties, the mesh including a plurality of elements, each of the elements being characterized by a shape;

providing a plurality of application modes;

selecting at least a first and a second of the application modes;

receiving an input of one or more physical properties for at least one of the selected application modes, wherein at least one of the one or more physical properties is specified in terms of at least one of the physical quantities;

generating a first plurality of partial differential equations based on the first application mode and a second plurality of partial differential equations based on the second application mode, each of the partial differential equations representing a behavior of at least one of the physical quantities of the model in response to the set of physical properties;

forming a combined system of partial differential equations based on the first and second pluralities of partial differential equations;

generating a solution based on the combined system of partial differential equations, the solution comprising numerical values for the physical quantities of node points in the mesh; and storing in a computer readable memory or in a computer readable data storage system the solution to the model.

237. The method of claim 236, wherein at least one of said one or more physical properties is defined as a mathematical expression in terms of said physical quantities, and at least one of said physical quantities is expressed in terms of a dependent variable associated with a least one of said application modes.

238. An apparatus for producing a model of a combined system having physical quantities by representing said physical quantities of said combined system by partial differential equations, said apparatus comprising:

a physical computing system comprising a first processor and a second processor, a user input device, a display device, and a memory device, said memory device containing executable instructions for producing a model of the combined system by representing the physical quantities of the combined system in terms of partial differential equations, the executable instructions causing the first processor or another processor to perform, upon execution, acts comprising representing the combined system by a geometry described by a mesh and a set of physical properties, the mesh including a plurality of elements, each of the elements being characterized by a shape;

providing a plurality of application modes;

selecting at least a first and a second of the application modes;

receiving an input of one or more physical properties for at least one of the selected application modes, wherein at least one of the one or more physical properties is specified in terms of at least one of the physical quantities;

using the first processor or the second processor to generate a first plurality of partial differential equations based on the first application mode and a second plurality of partial differential equations based on the second application mode, each of the partial differential equations representing a behavior of at least one of the physical quantities of the model in response to the set of physical properties;

forming a combined system of partial differential equations based on the first and second pluralities of partial differential equations;

generating a solution based on the combined system of partial differential equations, the solution comprising numerical values for the physical quantities of node points in the mesh; and storing in a computer readable memory or in a computer readable data storage system the solution to the model.

239. The method of claim 238, wherein at least one of said one or more physical properties is defined as a mathematical expression in terms of said physical quantities, and at least one of said physical quantities is expressed in terms of a dependent variable associated with at least one of said application modes.

* * * * *